United States Patent
Hayakawa et al.

(10) Patent No.: US 11,560,603 B2
(45) Date of Patent: Jan. 24, 2023

(54) GRAIN-ORIENTED ELECTRICAL STEEL SHEET AND METHOD FOR MANUFACTURING SAME

(71) Applicant: JFE STEEL CORPORATION, Tokyo (JP)

(72) Inventors: Yasuyuki Hayakawa, Tokyo (JP); Masanori Takenaka, Tokyo (JP); Takeshi Imamura, Tokyo (JP)

(73) Assignee: JFE STEEL CORPORATION, Chiyoda-ku Tokyo (JP)

( * ) Notice: Subject to any disclaimer, the term of this patent is extended or adjusted under 35 U.S.C. 154(b) by 44 days.

(21) Appl. No.: 16/333,729

(22) PCT Filed: Sep. 21, 2017

(86) PCT No.: PCT/JP2017/034170
§ 371 (c)(1),
(2) Date: Mar. 15, 2019

(87) PCT Pub. No.: WO2018/056379
PCT Pub. Date: Mar. 29, 2018

(65) Prior Publication Data
US 2019/0233914 A1    Aug. 1, 2019

(30) Foreign Application Priority Data
Sep. 21, 2016    (JP) .............................. JP2016-184742

(51) Int. Cl.
*C21D 9/46*    (2006.01)
*C21D 6/00*    (2006.01)
(Continued)

(52) U.S. Cl.
CPC ............... *C21D 9/46* (2013.01); *C21D 6/001* (2013.01); *C21D 6/002* (2013.01); *C21D 6/005* (2013.01);
(Continued)

(58) Field of Classification Search
CPC .................................. C21D 9/46; C22C 38/02
See application file for complete search history.

(56) References Cited

U.S. PATENT DOCUMENTS

2017/0335425 A1    11/2017    Joo et al.
2018/0037966 A1*    2/2018    Hayakawa .............. C22C 38/60

FOREIGN PATENT DOCUMENTS

EP    2843069 A1    3/2015
JP    S5761102 B2    12/1982
(Continued)

OTHER PUBLICATIONS

Dec. 26, 2017, International Search Report issued in the International Patent Application No. PCT/JP2017/034170.
(Continued)

*Primary Examiner* — Weiping Zhu
(74) *Attorney, Agent, or Firm* — Kenja IP Law PC

(57) ABSTRACT

Provided is a grain-oriented electrical steel sheet that has excellent magnetic properties and can be manufactured by secondary recrystallization orientation control using coil annealing with high productivity. A grain-oriented electrical steel sheet comprises a specific chemical composition, wherein an average value of a deviation angle $(\alpha^2+\beta^2)^{1/2}$ calculated from a deviation angle $\alpha$ from ideal Goss orientation around an ND rotation axis and a deviation angle $\beta$ from ideal Goss orientation around a TD rotation axis is 5.0° or less, and an area ratio $R_\beta$ of crystal grains with $\beta \leq 0.50°$ is 20% or less.

4 Claims, 15 Drawing Sheets

(51) Int. Cl.
| | |
|---|---|
| *C21D 8/12* | (2006.01) |
| *C22C 38/00* | (2006.01) |
| *C22C 38/04* | (2006.01) |
| *C22C 38/06* | (2006.01) |
| *C22C 38/60* | (2006.01) |
| *C22C 38/02* | (2006.01) |
| *H01F 1/16* | (2006.01) |
| *C21D 8/00* | (2006.01) |
| *C22C 38/08* | (2006.01) |
| *C22C 38/14* | (2006.01) |
| *C22C 38/20* | (2006.01) |
| *C22C 38/22* | (2006.01) |
| *C22C 38/26* | (2006.01) |
| *C22C 38/34* | (2006.01) |
| *H01F 1/147* | (2006.01) |

(52) U.S. Cl.
CPC ............ *C21D 6/008* (2013.01); *C21D 8/005* (2013.01); *C21D 8/1222* (2013.01); *C21D 8/1233* (2013.01); *C21D 8/1238* (2013.01); *C21D 8/1266* (2013.01); *C21D 8/1272* (2013.01); *C21D 8/1283* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/14* (2013.01); *C22C 38/20* (2013.01); *C22C 38/22* (2013.01); *C22C 38/26* (2013.01); *C22C 38/34* (2013.01); *C22C 38/60* (2013.01); *H01F 1/147* (2013.01); *H01F 1/16* (2013.01); *C22C 2202/02* (2013.01); *Y02P 10/20* (2015.11)

(56) References Cited

FOREIGN PATENT DOCUMENTS

| | | |
|---|---|---|
| JP | S59177349 A | 10/1984 |
| JP | H07268567 A | 10/1995 |
| JP | 2006299297 A | 11/2006 |
| JP | 2009155731 A | 7/2009 |
| JP | 2012087374 A | 5/2012 |
| JP | 2013108149 A | 6/2013 |
| JP | 5286872 B2 | 9/2013 |
| JP | 2016156068 A | 9/2016 |
| KR | 1020160072704 A | 6/2016 |
| WO | 2016129015 A1 | 8/2016 |
| WO | WO-2016129015 A1 * | 8/2016 ............. C22C 38/02 |

OTHER PUBLICATIONS

Tadao Nozawa et al., Magnetic Properties and Dynamic Domain Behavior in Grain-Oriented 3% Si—Fe, IEEE Transactions on Magnetics, Mar. 1996, pp. 572-589, vol. 32, No. 2.

Jun. 27, 2019, the Extended European Search Report issued by the European Patent Office in the corresponding European Patent Application No. 17853147.1.

Aug. 6, 2020, Office Action issued by the Korean Intellectual Property Office in the corresponding Korean Patent Application No. 10-2019-7011284 with English language concise statement of relevance.

* cited by examiner

GRAIN-ORIENTED ELECTRICAL STEEL SHEET AND METHOD FOR MANUFACTURING SAME

TECHNICAL FIELD

The present disclosure relates to a grain-oriented electrical steel sheet, and especially to a grain-oriented electrical steel sheet having reduced iron loss. The present disclosure also relates to a method for manufacturing the grain-oriented electrical steel sheet.

BACKGROUND

A grain-oriented electrical steel sheet is a soft magnetic material used as an iron core material of an electrical device such as a transformer or a generator, and has texture in which <001> orientation which is the easy magnetization axis of iron is highly aligned with the rolling direction of the steel sheet. Such texture is formed through secondary recrystallization annealing of preferentially causing the growth of giant crystal grains in (110)[001] orientation which is called Goss orientation.

The degree of preferred orientation of secondary recrystallized grains to (110)[001] orientation (hereafter referred to as "ideal Goss orientation") can be evaluated based on the "deviation angle" of the orientation of the secondary recrystallized grains from ideal Goss orientation. The deviation angle can be divided into the deviation angles around three rotation axes, namely, normal direction (ND) axis, transverse direction (TD) (direction orthogonal to the rolling direction) axis, and rolling direction (RD) axis. How the deviation angles $\alpha$, $\beta$, and $\gamma$ around the respective rotation axes influence the magnetic properties of the grain-oriented electrical steel sheet has been discussed.

Regarding the $\alpha$ angle which is the deviation angle around the ND axis, it is known that a smaller $\alpha$ angle improves the magnetic flux density of the grain-oriented electrical steel sheet, and the iron loss of the grain-oriented electrical steel sheet. Meanwhile, the $\gamma$ angle which is the deviation angle around the RD axis does not influence the angle from the easy magnetization axis <001>, and therefore its influence on the magnetic flux density and the iron loss is considered to be insignificant.

IEEE Trans. Magn. 1996, Vol. 32, No. 2, p. 572-589 (NPL 1) describes the influence of the $\beta$ angle which is the deviation angle around the TD axis on the iron loss in single crystal. According to NPL 1, the iron loss is most favorable when the $\beta$ angle is 2.0°, and the magnetic domain width increases and the iron loss increases as the $\beta$ angle approaches 0°.

JP H07-268567 A (PTL 1) proposes a grain-oriented electrical steel sheet having a deviation angle from ideal Goss orientation of 8° or less to improve iron loss. Likewise, JP 2009-155731 A (PTL 2) proposes a grain-oriented electrical steel sheet having a deviation angle of 5° or less.

In the case of simply defining "deviation angle" as in PTL 1 and PTL 2, the deviation angle denotes the compound angle of the $\alpha$ angle and the $\beta$ angle. Accordingly, even when the deviation angle as the compound angle is decreased, if the $\beta$ angle is close to 0°, the iron loss cannot necessarily be reduced as may be expected from the disclosure of NPL 1.

Techniques with focus on the $\beta$ angle are disclosed in, for example, JP S59-177349 A (PTL 3), JP S57-061102 B2 (PTL 4), and JP 5286872 B2 (PTL 5). PTL 3 and PTL 4 each propose a grain-oriented electrical steel sheet having a $\beta$ angle of 4.0° or less. PTL 5 proposes a grain-oriented electrical steel sheet in which the average change rate of the $\beta$ angle along the rolling direction in secondary recrystallized grains is 0.018°/mm to 0.06°/mm.

CITATION LIST

Patent Literatures

PTL 1: JP H07-268567 A
PTL 2: JP 2009-155731 A
PTL 3: JP S59-177349 A
PTL 4: JP S57-061102 B2
PTL 5: JP 5286872 B2

Non-Patent Literatures

NPL 1: IEEE Trans. Magn. 1996, Vol. 32, No. 2, p. 572-589

SUMMARY

Technical Problem

However, controlling the $\beta$ angle in a grain-oriented electrical steel sheet has the following problems.

NPL 1 states that iron loss can be reduced by setting the $\beta$ angle to 2.0°. However, it is impossible to set the $\beta$ angle to 2.0° in a typical grain-oriented electrical steel sheet, for the following reason. In a manufacturing process for a typical grain-oriented electrical steel sheet, a steel sheet is subjected to secondary recrystallization annealing in a coiled state, and then uncoiled and subjected to flattening annealing. Accordingly, the $\beta$ angle in the product sheet, i.e., the grain-oriented electrical steel sheet after the flattening annealing, changes depending on the curvature of the coil in the secondary recrystallization annealing. For example, in the case where the coil diameter is 1000 mm, the $\beta$ angle changes by 0.57° per a length of 10 mm in the rolling direction. Hence, for a grain-oriented electrical steel sheet with a secondary recrystallized grain size of about 10 mm or more, it is in principle impossible to set the $\beta$ angle in the whole product sheet to 2.0° which provides most favorable iron loss in single crystal.

For example, a method of increasing the rolling reduction in final cold rolling might be used to reduce the $\alpha$ angle and the $\beta$ angle, i.e., to improve the degree of preferred orientation. With such a method, however, the secondary recrystallized grain size increases nearly inevitably. Therefore, the iron loss cannot be reduced sufficiently in the case of subjecting the steel sheet to secondary recrystallization annealing in a coiled state.

According to PTL 3 and PTL 4, to set the $\beta$ angle to 4.0° or less, secondary recrystallization annealing is performed in a state in which the steel sheet is given a wavy shape extending in a direction intersecting the rolling direction, and then the steel sheet is adjusted to be flat. This method is adequate in principle, but requires provision of a wavy shape and adjustment, and thus is low in productivity. The method is therefore not suitable for industrial manufacture of grain-oriented electrical steel sheets.

According to PTL 5, the $\beta$ angle is controlled by increasing the coil diameter in secondary recrystallization annealing to 2000 mm to 6200 mm. With this method, however, in the case where the $\beta$ angle is 0.5° or less, the iron loss increases considerably, which makes it necessary to perform magnetic domain refining treatment.

It could, therefore, be helpful to provide a grain-oriented electrical steel sheet that has excellent magnetic properties and can be manufactured by secondary recrystallization orientation control using coil annealing with high productivity. It could also be helpful to provide a method for manufacturing the grain-oriented electrical steel sheet with excellent productivity.

Solution to Problem

We conducted an intensive study to solve the problems stated above. Experimental results that led to the present disclosure will be described below.

A plurality of steel slabs made of steel A and a plurality of steel slabs made of steel B different in chemical composition from the steel A were prepared. The chemical compositions of the steel A and the steel B are as follows. With regard to chemical compositions, "%" denotes "mass %" unless otherwise noted, and "ppm" denotes "mass ppm" unless otherwise noted.

(Steel A)
C: 0.030%,
Si: 3.4%,
Mn: 0.10%,
Sb: 0.07%,
P: 0.05%,
sol. Al: 60 ppm,
N: 30 ppm,
S: 20 ppm, and
Se: 1 ppm,
with the balance being Fe and inevitable impurities.
(Steel B)
C: 0.050%,
Si: 3.4%,
Mn: 0.08%,
Sb: 0.03%,
P: 0.10%,
Sb: 0.03%,
sol. Al: 60 ppm,
N: 30 ppm,
S: 25 ppm, and
Se: 1 ppm,
with the balance being Fe and inevitable impurities.

Each steel slab was heated to 1220° C., and then hot rolled to obtain a hot-rolled steel sheet with a sheet thickness of 2.4 mm. The hot-rolled steel sheet was then subjected to hot band annealing at 1050° C. for 30 sec. In the hot band annealing, the residence time ($t_{900-700° C.}$) from 900° C. to 700° C. during cooling was changed for each hot-rolled steel sheet. In a temperature range of 700° C. or less, the hot-rolled steel sheet was cooled to a normal temperature at a cooling rate of 40° C./sec.

The cross-sectional microstructure of the annealed hot-rolled steel sheet obtained as a result of the above-described procedure was investigated. FIG. 1 illustrates an example of the cross-sectional texture of an annealed hot-rolled steel sheet obtained from a slab made of the steel A. The average crystal grain size in the annealed hot-rolled steel sheet was approximately 100 µm to 150 µm. FIG. 2 is a diagram illustrating the relationship between the residence time ($t_{900-700° C.}$) from 900° C. to 700° C. during cooling in the hot band annealing and the area ratio ($R_C$) of carbide with a particle size of 1 µm or more in the annealed hot-rolled steel sheet. As illustrated in FIG. 2, $R_C$ was higher in the steel B having higher C content than in the steel A, and $R_C$ was lower when $t_{900-700° C.}$ was longer.

Subsequently, the annealed hot-rolled steel sheet was cold rolled under the conditions that the peak temperature was 220° C., to obtain a cold-rolled steel sheet with a final sheet thickness of 0.23 mm. The obtained cold-rolled steel sheet was then subjected to primary recrystallization annealing also serving as decarburization annealing. The primary recrystallization annealing was performed under the conditions of soaking temperature: 840° C., soaking time: 120 sec, hydrogen partial pressure: 55%, nitrogen partial pressure: 45%, and dew point: 55° C.

15 g/m² of an annealing separator having MgO as a main ingredient was applied to the surface of the obtained primary recrystallized steel sheet and dried, and the steel sheet was coiled to obtain a coil. The inner diameter of the coil was 500 mm, and the outer diameter of the coil was 1500 mm.

The coil was then subjected to secondary recrystallization annealing. In the secondary recrystallization annealing, the coil was first heated to 800° C. at a rate of 15° C./h, and then heated to 850° C. at a heating rate of 5° C./h from 800° C. to 850° C., in a nitrogen atmosphere. The coil was held at 850° C. for 50 h. After this, the atmosphere was switched to a hydrogen atmosphere, and the coil was held at 1180° C. for 5 h.

After the secondary recrystallization annealing, a coating agent made of 60% of colloidal silica and aluminum phosphate was applied to the surface of the steel sheet and dried. The steel sheet was then subjected to flattening annealing at 835° C. for 20 sec in a mixed atmosphere of nitrogen and hydrogen, for shape adjustment. A grain-oriented electrical steel sheet as a product was thus obtained.

Test pieces were collected from the obtained grain-oriented electrical steel sheet at a position of 1000 mm in coil diameter, and the magnetic properties of the test pieces were evaluated by the Epstein test. As the magnetic properties, the magnetic flux density ($B_8$) at a magnetizing force of 800 A/m and the iron loss ($W_{17/50}$) at the maximum magnetic flux density 1.7 T and a frequency of 50 Hz were measured.

Further, the secondary recrystallized grain orientation in a measurement region of 720 mm×280 mm was measured at 2 mm pitch using the X-ray Laue method, and the deviation angle $\alpha$ from ideal Goss orientation around the ND rotation axis and the deviation angle $\beta$ from ideal Goss orientation around the TD rotation axis were calculated. Using the obtained $\alpha$ and $\beta$, the deviation angle $(\alpha^2+\beta^2)^{1/2}$ from <100> direction at each measurement position was calculated, and the average value of $(\alpha^2+\beta^2)^{1/2}$ for all measurement positions was determined.

FIG. 3 is a diagram illustrating the relationship between $t_{900-700° C.}$ and the magnetic flux density ($B_8$). As illustrated in FIG. 3, the magnetic flux density was improved more when $t_{900-700° C.}$ was longer, in both the steel A and the steel B. FIG. 4 is a diagram illustrating the relationship between $t_{900-700° C.}$ and the iron loss ($W_{17/50}$). As illustrated in FIG. 4, the iron loss was higher when $t_{900-700° C.}$ was longer in the steel A, whereas the iron loss was lower when the residence time was longer in the steel B.

Next, the correlation between the average value of $(\alpha^2+\beta^2)^{1/2}$ which is the deviation angle from <100> direction and the magnetic properties was investigated. FIG. 5 is a diagram illustrating the relationship between the average value of $(\alpha^2+\beta^2)^{1/2}$ and the magnetic flux density. FIG. 6 is a diagram illustrating the relationship between the average value of $(\alpha^2+\beta^2)^{1/2}$ and the iron loss. As illustrated in FIG. 5, the correlation between the average value of $(\alpha^2+\beta^2)^{1/2}$ and the magnetic flux density was very high, and favorable magnetic flux density ($B_8$=1.92 T) was achieved when the average value of $(\alpha^2+\beta^2)^{1/2}$ was 5° or less. As illustrated in FIG. 6, the relationship between the average value of $(\alpha^2+\beta^2)^{1/2}$ and the iron loss was different between the steel A and the steel B.

These results revealed that the residence time and the average value of $(\alpha^2+\beta^2)^{1/2}$ correlate well with the magnetic flux density, but do not show a sufficient correlation with the iron loss. Accordingly, we conducted a study on which index of secondary recrystallized grain orientation has a high correlation with the iron loss. We consequently discovered that the area ratio ($R_\beta$) of secondary recrystallized grains with a deviation angle β of 0.50° or less shows a high correlation with the iron loss. FIG. 7 is a diagram illustrating the relationship between $t_{900\text{-}700°\ C.}$ and $R_\beta$. $R_\beta$ was higher when $t_{900\text{-}700°\ C.}$ was longer in the steel A, whereas the opposite tendency was seen in the steel B. These tendencies are considered to correspond to the changes in iron loss illustrated in FIGS. 4 and 6.

FIG. 8 is a diagram illustrating the relationship between $R_\beta$ and the iron loss. As illustrated in FIG. 8, $R_\beta$ and the iron loss correlated well with each other. Specifically, favorable iron loss was achieved when $R_\beta$ was 20% or less, and more favorable iron loss was achieved when $R_\beta$ was 15% or less.

FIG. 9 is a diagram illustrating the relationship between the average value of the deviation angle γ from ideal Goss orientation around the RD rotation axis (hereafter referred to as "average γ angle") and the iron loss. As illustrated in FIG. 9, there was also a clear correlation between the average γ angle and the iron loss, and the iron loss was lower when the average γ angle was greater. Specifically, more favorable iron loss was achieved when the average γ angle was 3.0° or more, and further favorable iron loss was achieved when the average γ angle was 4.5° or more.

The reason why the influence of the residence time on the iron loss was different between the steel A and the steel B can be explained based on the relationship between the residence time and $R_C$ illustrated in FIG. 2, as follows. As illustrated in FIG. 2, when the residence time was changed in a range of 0 sec to 600 sec, $R_C$ in the steel A changed in a range of about 5% to 25%, and $R_C$ in the steel B changed in a range of about 0% to 5%. FIG. 10 is a diagram illustrating the relationship between $R_C$ and $R_\beta$. As illustrated in FIG. 10, the tendency of $R_\beta$ in a range of $R_C$ corresponding to the steel A and the tendency of $R_\beta$ in a range of $R_C$ corresponding to the steel B were opposite to each other. This resulted in the difference of the influence of $t_{900\text{-}700°\ C.}$ on the iron loss between the steel A and the steel B.

Moreover, as illustrated in FIG. 10, $R_\beta$ was a minimum value when $R_C$ was about 5%. Since lower $R_\beta$ contributes to lower iron loss as illustrated in FIG. 8, the most effective way of reducing the iron loss is to set $R_C$ to about 5%. In addition, as illustrated in FIG. 10, $R_C$ needs to be 0.5% to 20% in order to obtain $R_\beta$ of 20% or less contributing to favorable iron loss, and needs to be 2.0% to 15% in order to obtain $R_\beta$ of 15% or less contributing to further favorable iron loss.

FIG. 11 is a diagram illustrating the relationship between $R_C$ and the average γ angle of secondary recrystallized grains. As illustrated in FIG. 11, when $R_C$ was about 5%, the average γ angle of secondary recrystallized grains was a maximum value, which is most effective in iron loss reduction. In this experiment, the β angle and the γ angle changed simultaneously, and the contributions of their respective effects were not able to be separated.

The reason why the tendency of the average γ angle was different between the steel A and the steel B is considered as follows: Since the C content in the raw material was different between the steel A and the steel B, the change of $R_C$ when changing $t_{900\text{-}700°\ C.}$ was different.

From these results, we discovered the following:

(1) By decreasing the average value of the deviation angle $(\alpha^2+\beta^2)^{1/2}$ from ideal Goss orientation, the magnetic flux density of the grain-oriented electrical steel sheet can be improved.

(2) By limiting $R_\beta$ to 20% or less and preferably to 15% or less, the iron loss of the grain-oriented electrical steel sheet can be reduced.

(3) By limiting the average γ angle to 3° or more and preferably to 4.5° or more, the iron loss can be further reduced.

(4) To realize secondary recrystallized grain orientation satisfying the above-described conditions, $R_C$ in the hot band annealed sheet needs to be in a range of 0.5% to 20% and preferably in a range of 2.0% to 15%.

Next, the influence of the coil diameter in the secondary recrystallization annealing on the magnetic properties of the steel sheet in the longitudinal direction (rolling direction) was investigated. FIG. 12 is a diagram illustrating the relationship between the coil diameter when performing the secondary recrystallization annealing and the magnetic flux density $B_8$ of the obtained grain-oriented electrical steel sheet. The secondary recrystallization annealing was performed under the conditions of $t_{900\text{-}700°\ C.}$: 20 sec. As illustrated in FIG. 12, $B_8$ was improved more when the coil diameter was larger, in both the steel A and the steel B.

FIG. 13 is a diagram illustrating the relationship between the coil diameter and the average value of $(\alpha^2+\beta^2)^{1/2}$. As illustrated in FIG. 13, the average value of $(\alpha^2+\beta^2)^{1/2}$ was lower when the coil diameter was larger. This can be attributed to the change in β angle due to the influence of coil curvature. The result of measuring the average secondary recrystallized grain size in the obtained grain-oriented electrical steel sheet was 18 mm in the steel A and 11 mm in the steel B. Thus, the influence of the coil diameter was larger in the steel A having a larger secondary recrystallized grain size.

FIG. 14 is a diagram illustrating the relationship between the coil diameter and the iron loss $W_{17/50}$. The iron loss was improved more when the coil diameter was larger. FIG. 15 is a diagram illustrating the relationship between the coil diameter and $R_\beta$. $R_\beta$ was lower when the coil diameter was larger. This result corresponds to the tendency of the iron loss illustrated in FIG. 14. It is considered that, when the coil diameter was larger, the β angle was closer to the value in the case of performing the secondary recrystallization annealing in a state of holding the steel sheet flat, and the value of this β angle was more than 0.5°.

The present disclosure is based on the experimental results described above. We thus provide the following.

1. A grain-oriented electrical steel sheet comprising
a chemical composition containing (consisting of), in mass %,
C: 0.005% or less,
Si: 3.0% or more and 4.0% or less,
Mn: 0.05% or more and 0.50% or less,
sol. Al: 0.001% or less,
N: 0.0015% or less,
S: 0.0010% or less, and
Se: 0.0010% or less,
with the balance being Fe and inevitable impurities,
wherein an average value of a deviation angle $(\alpha^2+\beta^2)^{1/2}$ calculated from a deviation angle α from ideal Goss orientation around an ND rotation axis and a deviation angle β from ideal Goss orientation around a TD rotation axis is 5.0° or less, and an area ratio $R_\beta$ of crystal grains with $\beta \leq 0.50°$ is 20% or less 2. The grain-oriented electrical steel sheet according to 1., wherein an average value of a deviation angle γ from ideal Goss orientation around an RD rotation axis is 3.0° or more and 7.0° or less.

3. The grain-oriented electrical steel sheet according to 1. or 2., wherein the chemical composition further contains, in mass %, one or more selected from the group consisting of Sb: 0.005% or more and 0.1% or less,
Sn: 0.005% or more and 0.1% or less,
P: 0.005% or more and 0.1% or less,
Ni: 0.005% or more and 1.5% or less,
Cu: 0.005% or more and 1.5% or less,
Cr: 0.005% or more and 0.1% or less,
Mo: 0.005% or more and 0.5% or less,
Ti: 0.0005% or more and 0.1% or less,
Nb: 0.0005% or more and 0.1% or less,
V: 0.0005% or more and 0.1% or less,
B: 0.0002% or more and 0.0025% or less,
Bi: 0.005% or more and 0.1% or less,
Te: 0.0005% or more and 0.01% or less, and
Ta: 0.0005% or more and 0.01% or less.

4. A method for manufacturing a grain-oriented electrical steel sheet, the method comprising:

optionally heating a steel slab to a heating temperature of 1300° C. or less, the steel slab having a chemical composition containing, in mass %, C: 0.025% or more and 0.060% or less,
Si: 3.0% or more and 4.0% or less,
Mn: 0.05% or more and 0.50% or less,
sol. Al: less than 0.01%,
N: less than 0.006%, and
S and Se: less than 0.010% in total,
with the balance being Fe and inevitable impurities;

subjecting the steel slab to hot rolling to obtain a hot-rolled steel sheet;

subjecting the hot-rolled steel sheet to hot band annealing;

subjecting the hot-rolled steel sheet annealed by the hot band annealing, to cold rolling to obtain a cold-rolled steel sheet with a final sheet thickness;

subjecting the cold-rolled steel sheet to primary recrystallization annealing to obtain a primary recrystallized steel sheet;

applying an annealing separator to the primary recrystallized steel sheet;

coiling the primary recrystallized steel sheet to which the annealing separator has been applied, to obtain a coil; and subjecting the coil to secondary recrystallization annealing, wherein an area ratio $R_C$ of carbide with a particle size of 1 μm or more at start of final cold rolling in the cold rolling is 0.5% to 20.0%, an average crystal grain size D at the start of the final cold rolling is 50 μm or more and 300 μm or less, and a maximum temperature $T_{max}$ in the final cold rolling is 150° C. or more.

5. The method for manufacturing a grain-oriented electrical steel sheet according to 4., wherein the chemical composition further contains, in mass %, one or more selected from the group consisting of Sb: 0.005% or more and 0.1% or less,
Sn: 0.005% or more and 0.1% or less,
P: 0.005% or more and 0.1% or less,
Ni: 0.005% or more and 1.5% or less,
Cu: 0.005% or more and 1.5% or less,
Cr: 0.005% or more and 0.1% or less,
Mo: 0.005% or more and 0.5% or less,
Ti: 0.0005% or more and 0.1% or less,
Nb: 0.0005% or more and 0.1% or less,
V: 0.0005% or more and 0.1% or less,
B: 0.0002% or more and 0.0025% or less,
Bi: 0.005% or more and 0.1% or less,
Te: 0.0005% or more and 0.01% or less, and
Ta: 0.0005% or more and 0.01% or less.

6. The method for manufacturing a grain-oriented electrical steel sheet according to 4. or 5., wherein a diameter of the coil in the secondary recrystallization annealing is 700 mm or more.

Advantageous Effect

It is thus possible to obtain a grain-oriented electrical steel sheet having excellent magnetic properties. The grain-oriented electrical steel sheet can be manufactured by secondary recrystallization orientation control using coil annealing, and therefore has excellent productivity.

DETAILED DESCRIPTION

Figure 1:
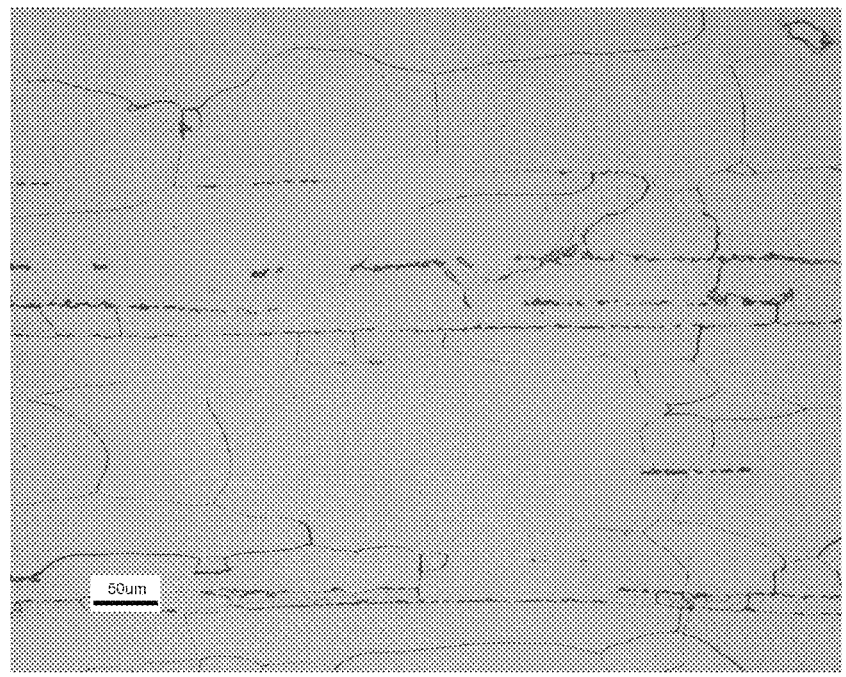
FIG. 1 illustrates an example of the cross-sectional texture of an annealed hot-rolled steel sheet yielded from a slab made of steel A.
Figure 2:
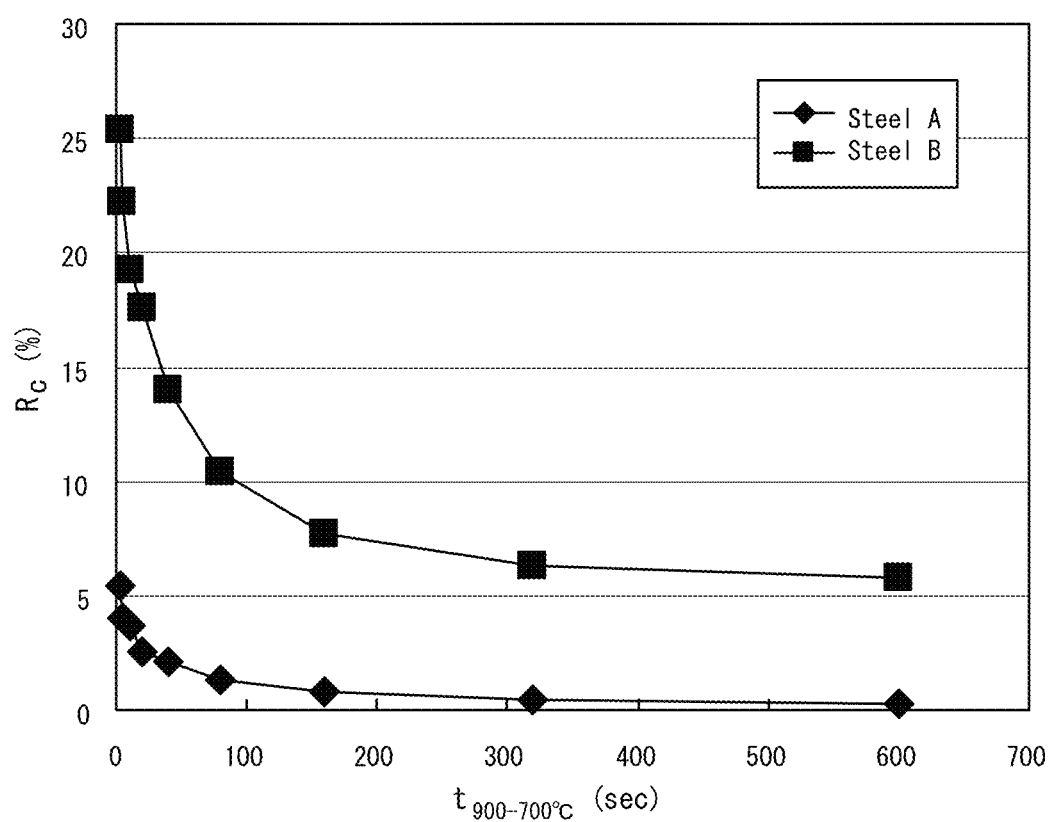
FIG. 2 is a diagram illustrating the relationship between the residence time ($t_{900-700° C.}$) from 900° C. to 700° C. during cooling in hot band annealing and the area ratio ($R_C$) of carbide with a particle size of 1 μm or more in an annealed hot-rolled steel sheet.
Figure 3:
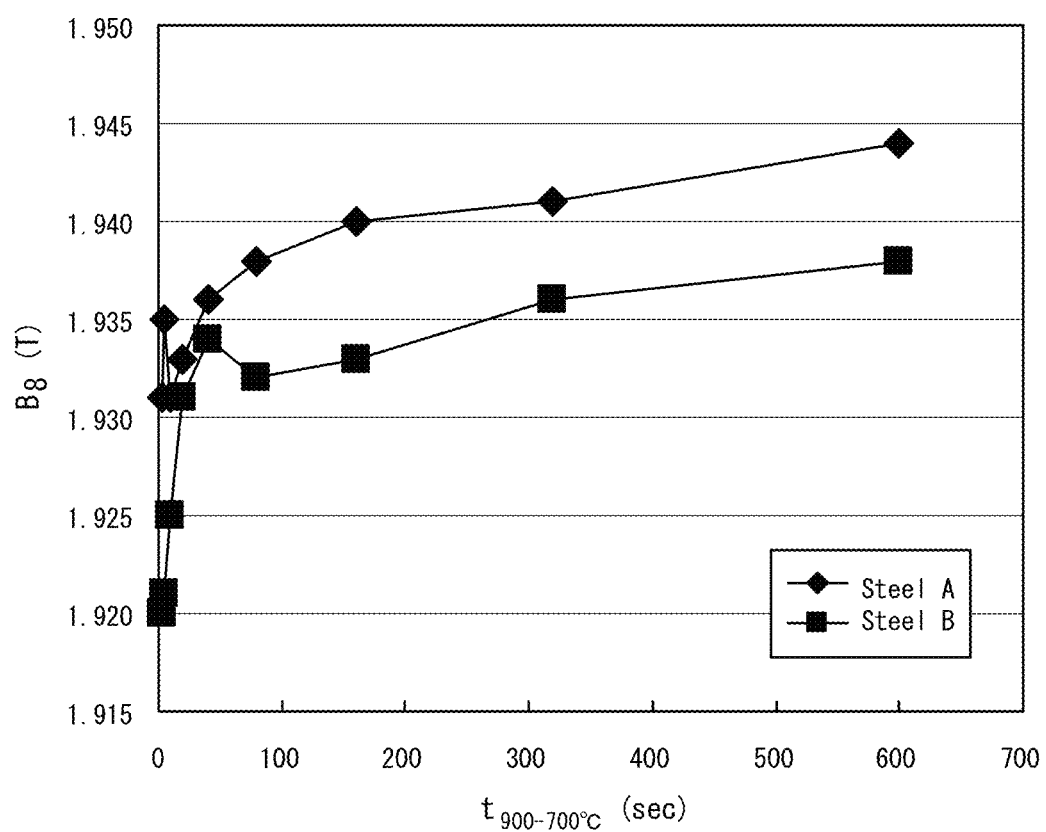
FIG. 3 is a diagram illustrating the relationship between the residence time ($t_{900-700° C.}$) from 900° C. to 700° C. during cooling in hot band annealing and the magnetic flux density ($B_8$)
Figure 4:
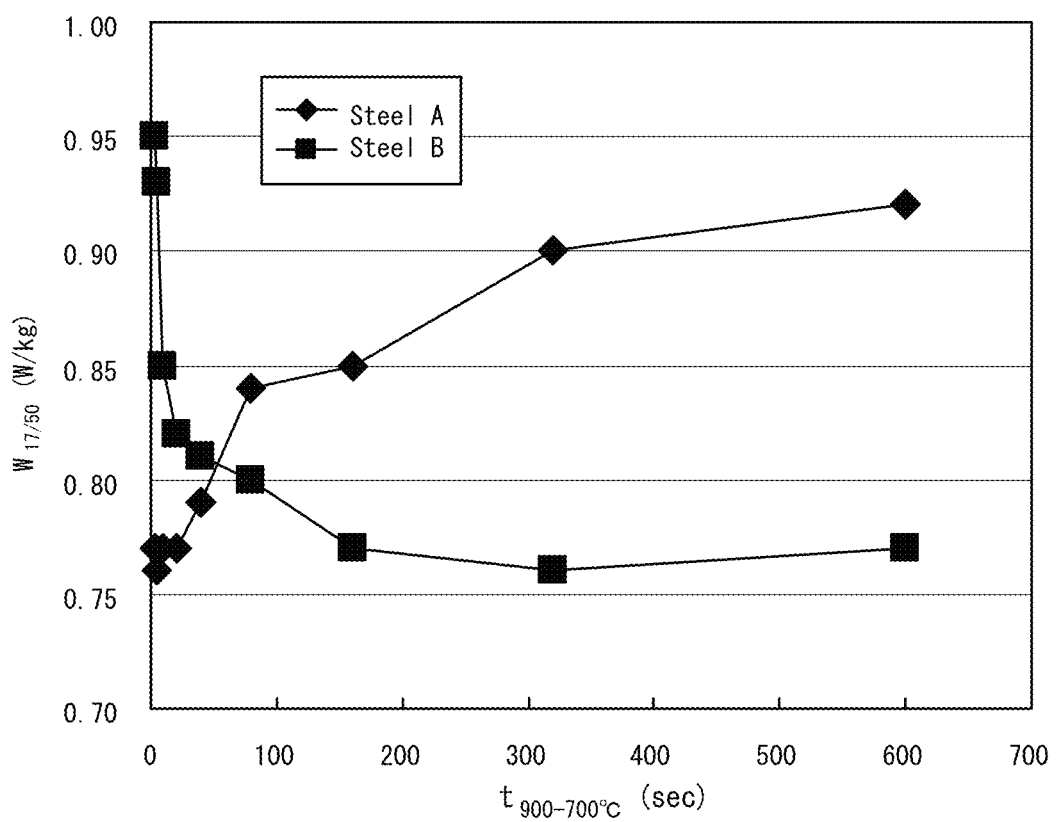
FIG. 4 is a diagram illustrating the relationship between the residence time ($t_{900-700° C.}$) from 900° C. to 700° C. during cooling in hot band annealing and the iron loss ($W_{17/50}$)
Figure 5:
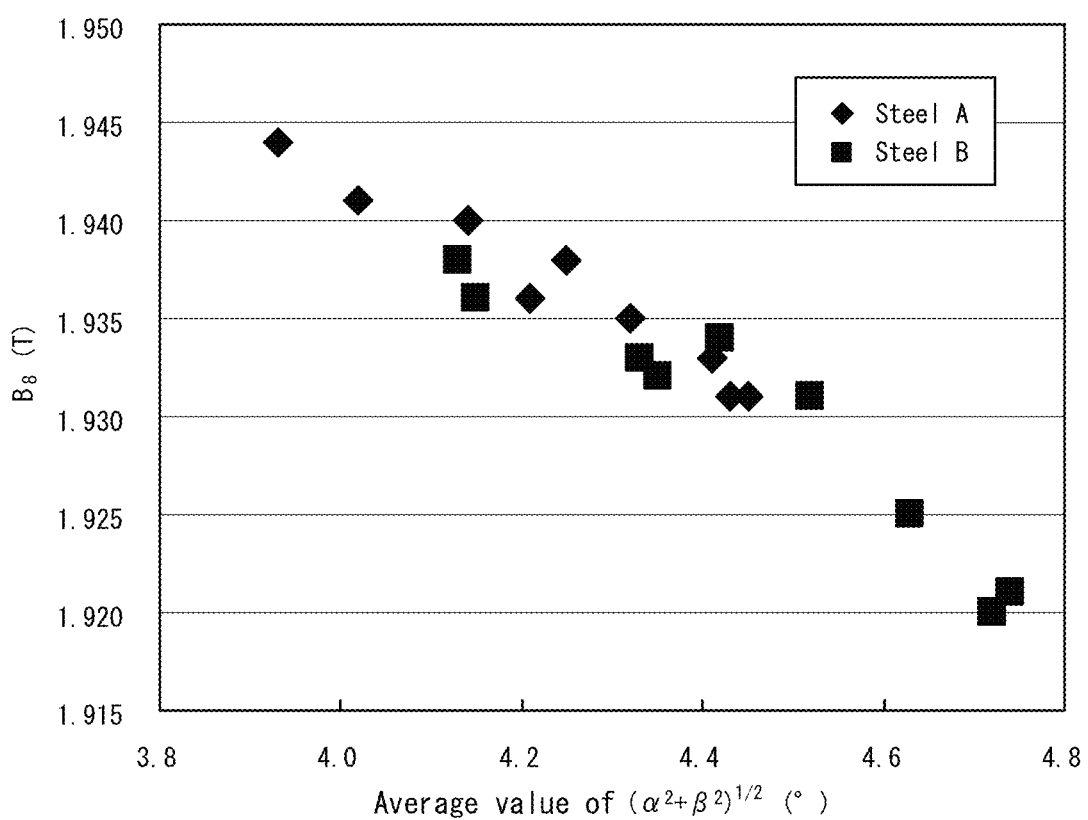
FIG. 5 is a diagram illustrating the relationship between the average value of $(\alpha^2+\beta^2)^{1/2}$ which is the deviation angle from <100> direction and the magnetic flux density ($B_8$)
Figure 6:
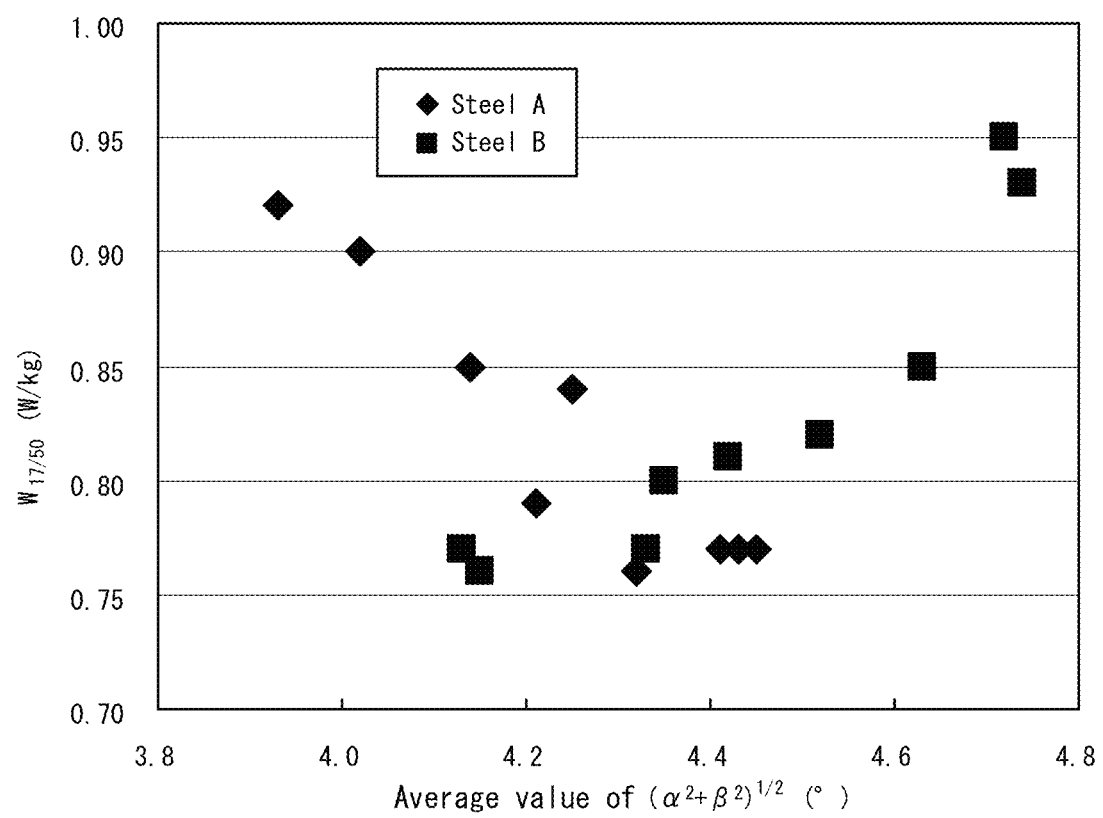
FIG. 6 is a diagram illustrating the relationship between the average value of $(\alpha^2+\beta^2)^{1/2}$ which is the deviation angle from <100> direction and the iron loss ($W_{17/50}$)
Figure 7:
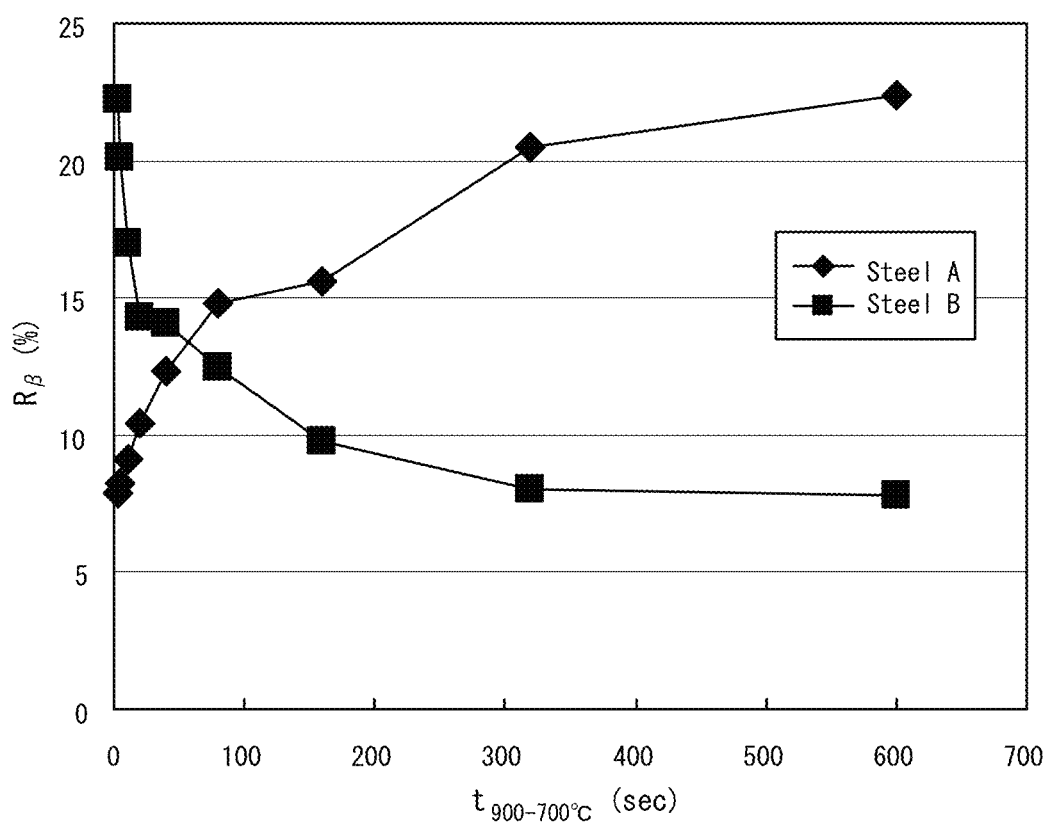
FIG. 7 is a diagram illustrating the relationship between the residence time ($t_{900-700° C.}$) from 900° C. to 700° C. during cooling in hot band annealing and the area ratio ($R_\beta$) of secondary recrystallized grains with a deviation angle β of 0.50° or less.
Figure 8:
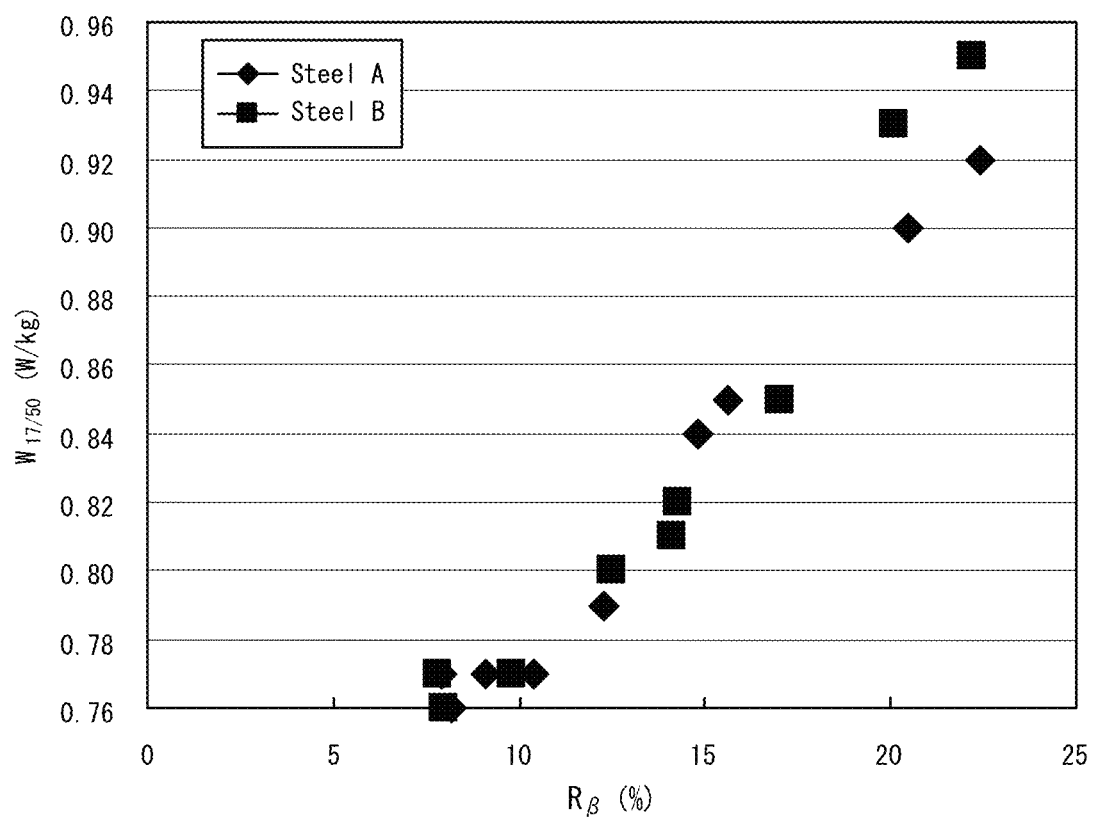
FIG. 8 is a diagram illustrating the relationship between the area ratio ($R_\beta$) of secondary recrystallized grains with a deviation angle β of 0.50° or less and the iron loss ($W_{17/50}$)
Figure 9:
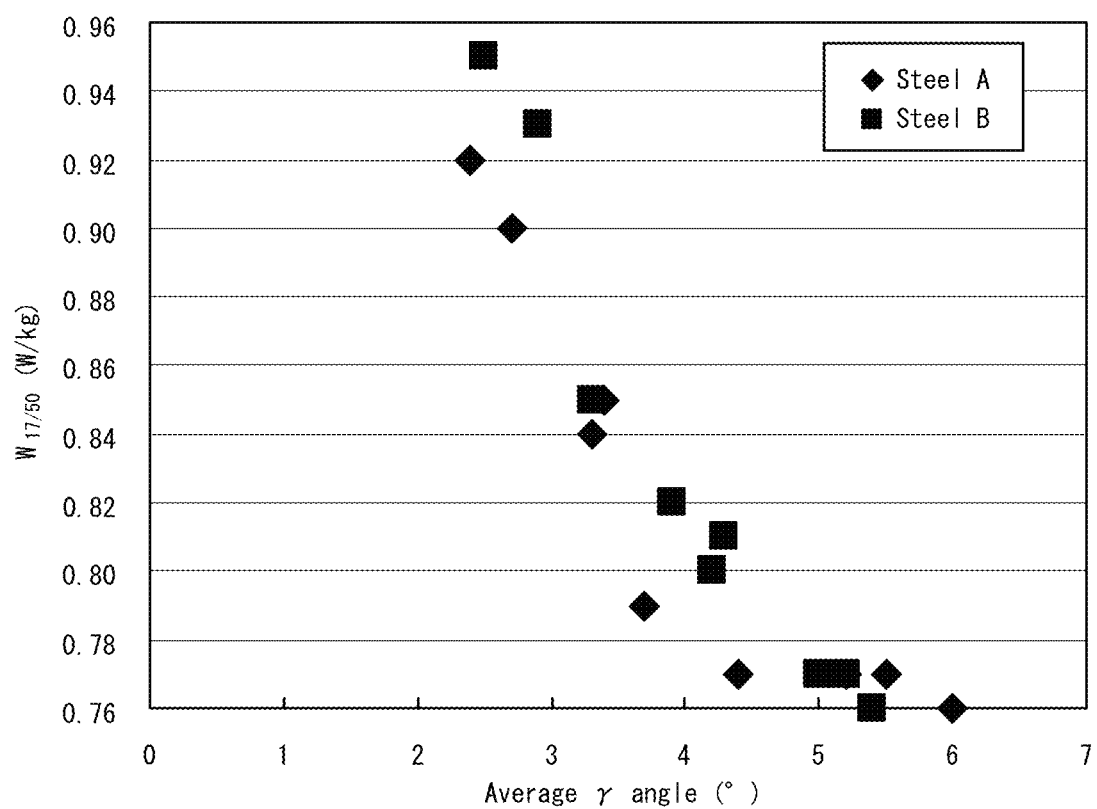
FIG. 9 is a diagram illustrating the relationship between the average value of the deviation angle γ from ideal Goss orientation around the RD rotation axis and the iron loss ($W_{17/50}$)
Figure 10:
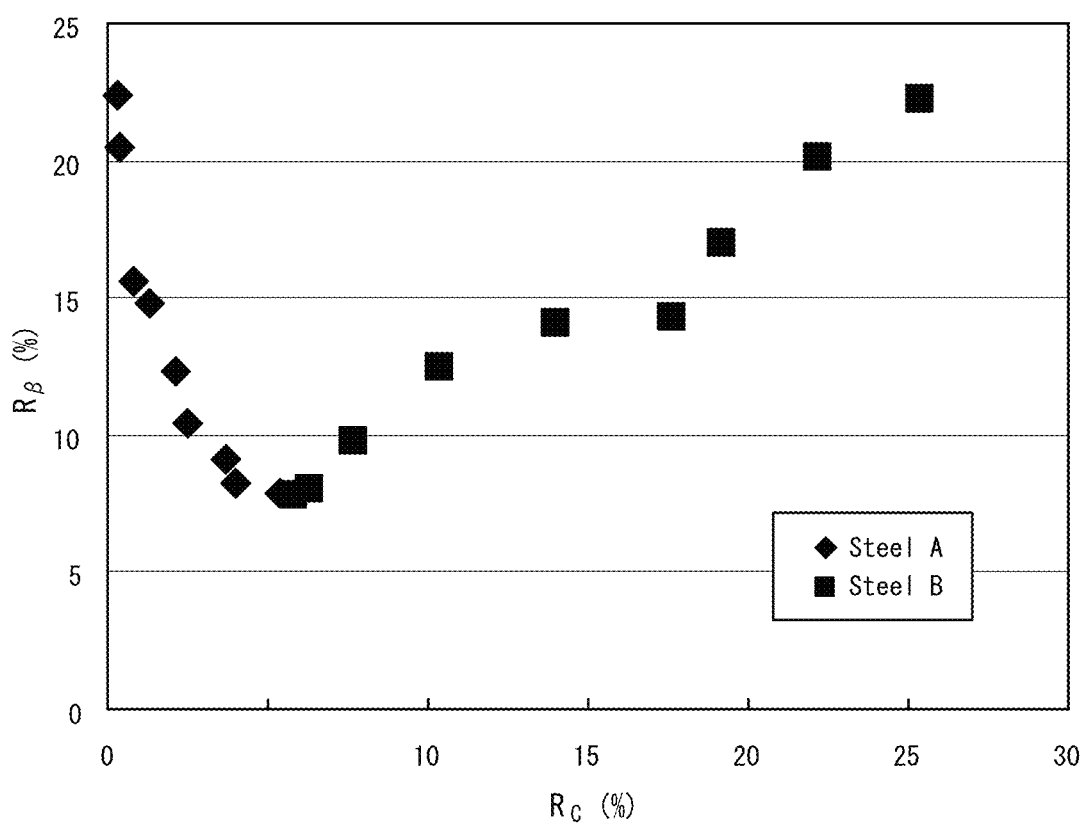
FIG. 10 is a diagram illustrating the relationship between the area ratio ($R_C$) of carbide with a particle size of 1 μm or more and the area ratio ($R_\beta$) of secondary recrystallized grains with a deviation angle β of 0.50° or less.
Figure 11:
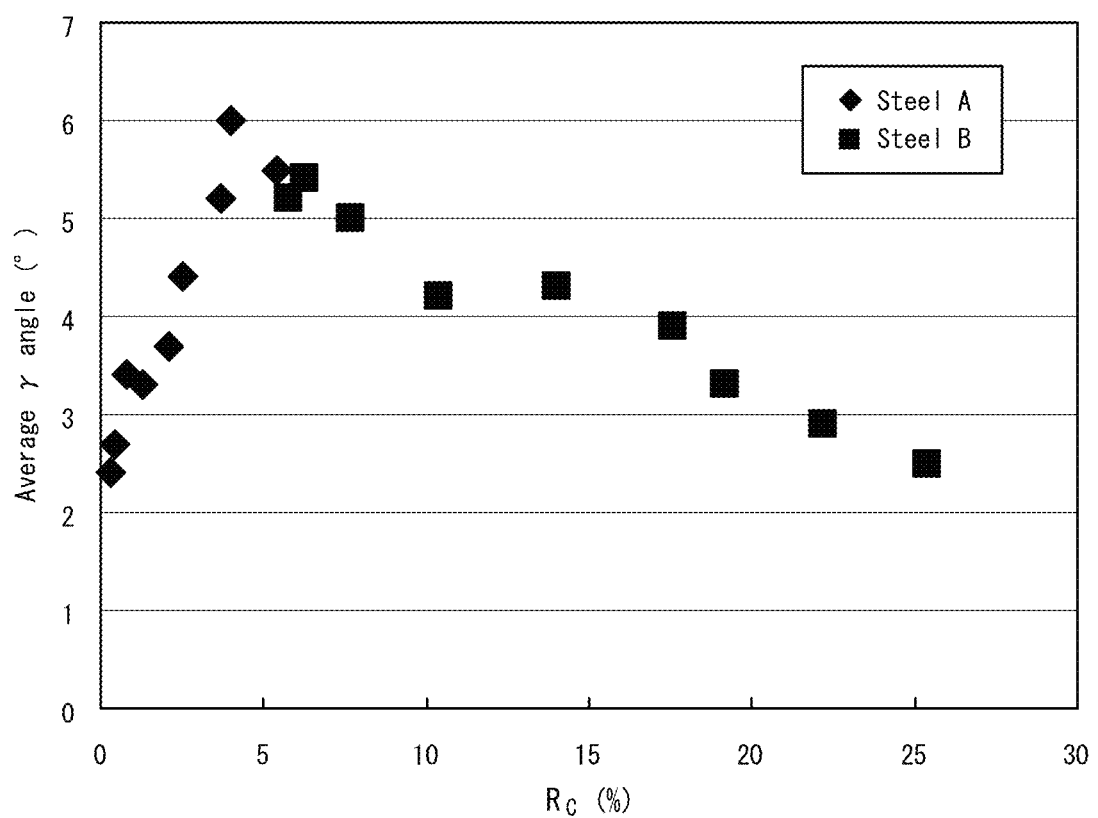
FIG. 11 is a diagram illustrating the relationship between the area ratio ($R_C$) of carbide with a particle size of 1 μm or more and the average value of the deviation angle γ from ideal Goss orientation around the RD rotation axis.
Figure 12:
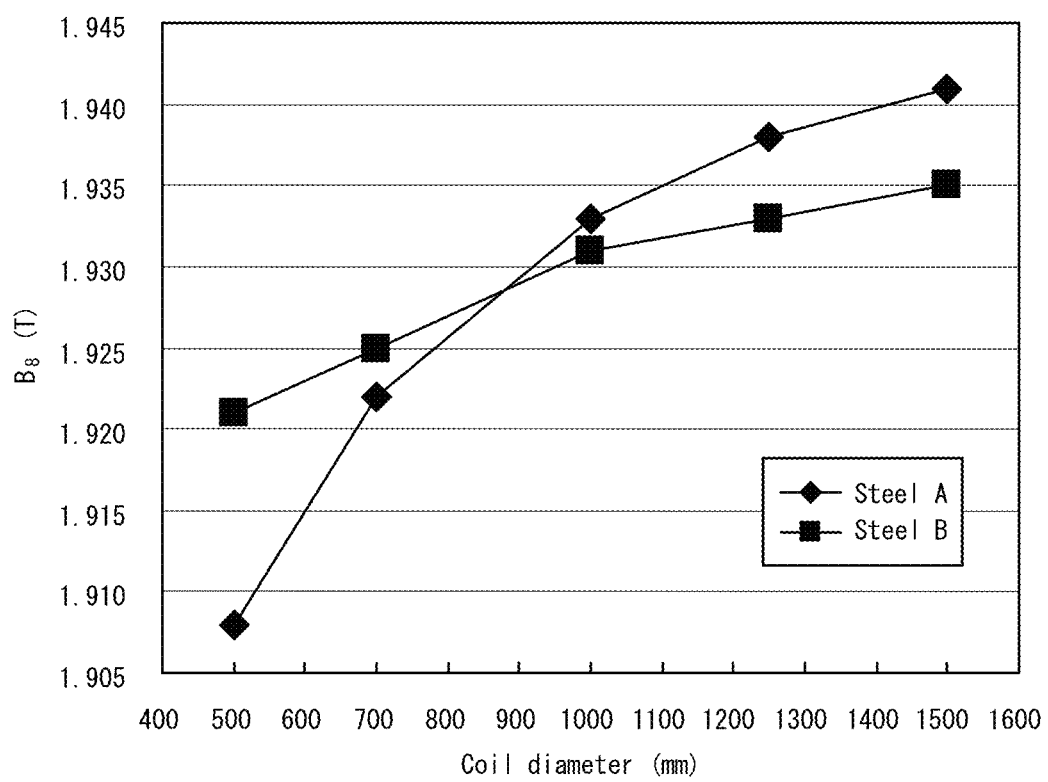
FIG. 12 is a diagram illustrating the relationship between the coil diameter and the magnetic flux density ($B_8$)
Figure 13:
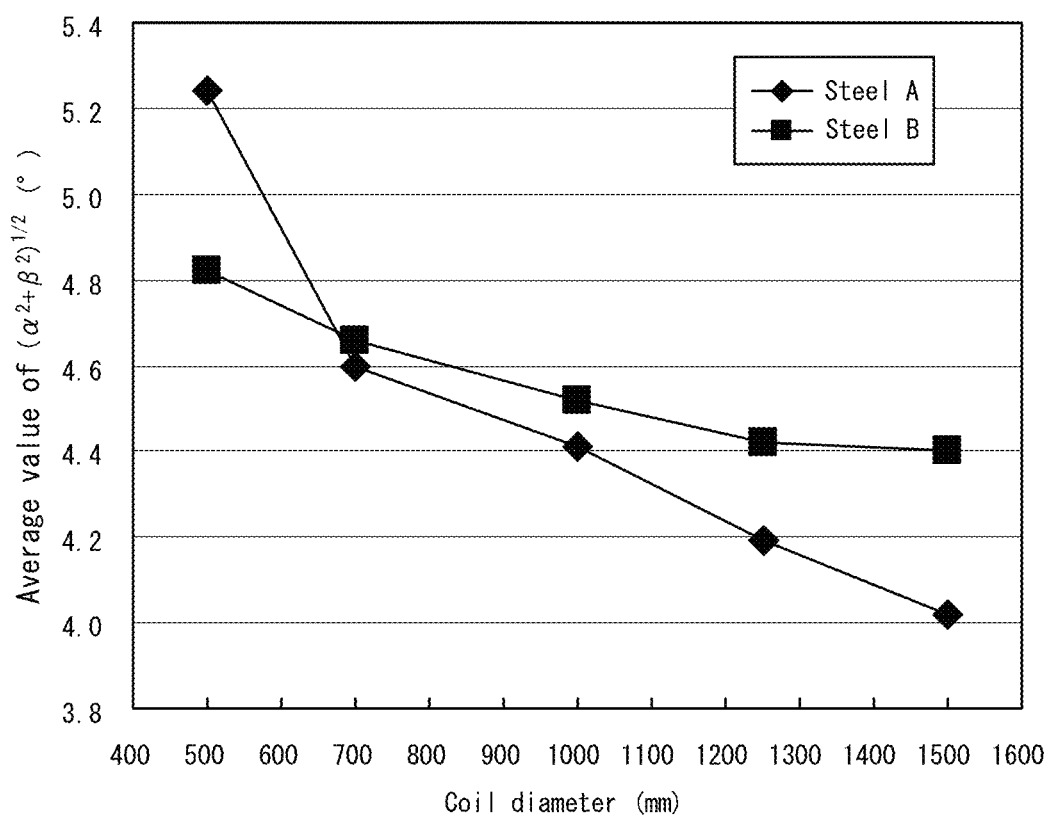
FIG. 13 is a diagram illustrating the relationship between the coil diameter and the average value of $(\alpha^2+\beta^2)^{1/2}$ which is the deviation angle from <100> direction.
Figure 14:
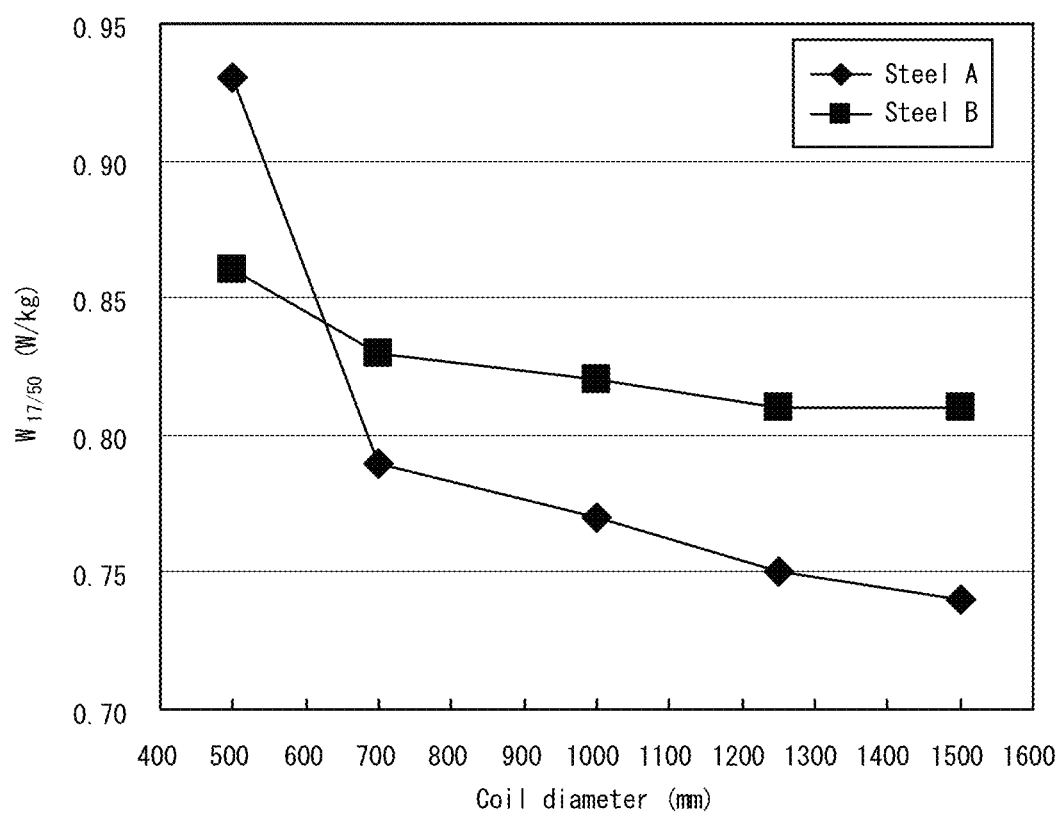
FIG. 14 is a diagram illustrating the relationship between the coil diameter and the iron loss ($W_{17/50}$)
Figure 15:
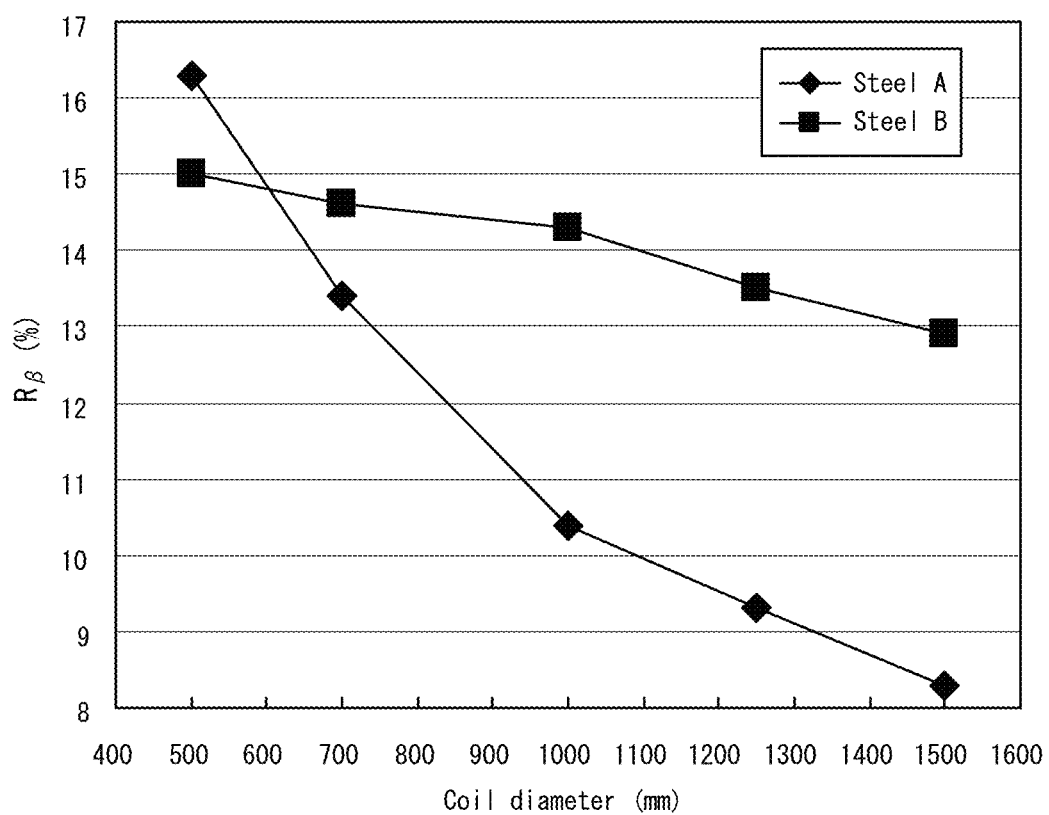
FIG. 15 is a diagram illustrating the relationship between the coil diameter and the area ratio ($R_\beta$) of secondary recrystallized grains with a deviation angle β of 0.50° or less.

A grain-oriented electrical steel sheet according to one of the disclosed embodiments will be described below.

[Chemical Composition of Grain-Oriented Electrical Steel Sheet]

The reasons for limiting the chemical composition of the grain-oriented electrical steel sheet will be described below. In the description, "%" representing the content of each component element denotes "mass %" unless otherwise noted.

C: 0.005% or less

C is an element that causes iron loss degradation due to magnetic aging. The C content is therefore 0.005% or less. The C content is preferably 0.003% or less, more preferably 0.002% or less, and further preferably 0.0015% or less. Lower C content is more desirable, and accordingly the lower limit may be 0%. In industrial terms, however, the lower limit may be more than 0%. Excessively reducing C increases the manufacturing cost, and therefore the C content may be 0.0001% or more, and may be 0.0005% or more.

Si: 3.0% or more and 4.0% or less

Si is an element having an effect of improving iron loss by increasing electrical resistance. To achieve this effect, the Si content is 3.0% or more.

The Si content is preferably 3.1% or more, and more preferably 3.2% or more. If the Si content is more than 4.0%, secondary workability decreases significantly. The Si content is therefore 4.0% or less. The Si content is preferably 3.8% or less, and more preferably 3.7% or less.

Mn: 0.05% or more and 0.50% or less

Mn combines with S or Se to form MnS or MnSe, thus stabilizing the magnetic properties through stabilization of the primary recrystallized grain size. Mn also has an effect of improving hot workability during manufacture. To achieve these effects, the Mn content is 0.05% or more. The Mn content is preferably 0.07% or more, and more preferably 0.09% or more. If the Mn content is more than 0.50%, the primary recrystallized texture degrades and the magnetic properties degrade. The Mn content is therefore 0.50% or less. The Mn content is preferably 0.25% or less, more preferably 0.15% or less, and further preferably 0.10% or less.

sol. Al: 0.001% or less

Al is an inhibitor element. If Al remains in the grain-oriented electrical steel sheet, the iron loss degrades. The sol. Al (acid-soluble aluminum) content is therefore 0.001% or less. The sol. Al content is preferably 0.0008% or less. Lower sol. Al content is more desirable, and accordingly the lower limit may be 0%. In industrial terms, however, the lower limit may be more than 0%. Excessively reducing sol. Al can increase the manufacturing cost, and therefore the sol. Al content may be 0.0001% or more.

N: 0.0015% or less

N is an inhibitor element, as with Al. If N remains in the grain-oriented electrical steel sheet, the iron loss degrades. The N content is therefore 0.0015% or less. The N content is preferably 0.0010% or less, and more preferably 0.0008% or less. Lower N content is more desirable, and accordingly the lower limit may be 0%. In industrial terms, however, the lower limit may be more than 0%. Excessively reducing N can increase the manufacturing cost, and therefore the N content may be 0.00001% or more, may be 0.00005% or more, and may be 0.0001% or more.

S: 0.0010% or less

S is an inhibitor element. If S remains in the grain-oriented electrical steel sheet, the iron loss degrades. The S content is therefore 0.0010% or less. The S content is more preferably 0.0008% or less. Lower S content is more desirable, and accordingly the lower limit may be 0%. In industrial terms, however, the lower limit may be more than 0%. Excessively reducing S can increase the manufacturing cost, and therefore the S content may be 0.00001% or more, may be 0.00005% or more, and may be 0.0001% or more.

Se: 0.0010% or less

Se is an inhibitor element, as with S. If Se remains in the grain-oriented electrical steel sheet, the iron loss degrades. The Se content is therefore 0.0010% or less. The Se content is preferably 0.0005% or less, and more preferably 0.0002% or less. Lower Se content is more desirable, and accordingly the lower limit may be 0%. In industrial terms, however, the lower limit may be more than 0%. Excessively reducing Se can increase the manufacturing cost, and therefore the Se content may be 0.00001% or more, may be 0.00005% or more, and may be 0.0001% or more.

The grain-oriented electrical steel sheet according to one of the disclosed embodiments has a chemical composition containing the above-described components with the balance being Fe and inevitable impurities.

The steel sheet according to one of the disclosed embodiments is basically composed of the above-described components. To achieve better magnetic properties, the chemical composition may optionally further contain one or more selected from the group consisting of Sb: 0.005% or more and 0.1% or less,
Sn: 0.005% or more and 0.1% or less,
P: 0.005% or more and 0.1% or less,
Ni: 0.005% or more and 1.5% or less,
Cu: 0.005% or more and 1.5% or less,
Cr: 0.005% or more and 0.1% or less,
Mo: 0.005% or more and 0.5% or less,
Ti: 0.0005% or more and 0.1% or less,
Nb: 0.0005% or more and 0.1% or less,
V: 0.0005% or more and 0.1% or less,
B: 0.0002% or more and 0.0025% or less,
Bi: 0.005% or more and 0.1% or less,
Te: 0.0005% or more and 0.01% or less, and
Ta: 0.0005% or more and 0.01% or less.

Sb: 0.005% or more and 0.1% or less

Sb is a grain boundary segregation element and has an effect of suppressing the nitriding or oxidation of the steel sheet during secondary recrystallization annealing and promoting the secondary recrystallization of crystal grains having favorable crystal orientation to effectively improve the magnetic properties. To achieve this effect, in the case of adding Sb, the Sb content is 0.005% or more. The Sb content is preferably 0.010% or more, and more preferably 0.020% or more. If the Sb content is more than 0.1%, cold rollability decreases. Accordingly, in the case of adding Sb, the Sb content is 0.1% or less. The Sb content is preferably 0.08% or less, and more preferably 0.07% or less.

Sn: 0.005% or more and 0.1% or less

Sn is a grain boundary segregation element as with Sb and has an effect of suppressing the nitriding or oxidation of the steel sheet during secondary recrystallization annealing and promoting the secondary recrystallization of crystal grains having favorable crystal orientation to effectively improve the magnetic properties. To achieve this effect, in the case of adding Sn, the Sn content is 0.005% or more. The Sn content is preferably 0.01% or more. If the Sn content is more than 0.1%, cold rollability decreases. Accordingly, in the case of adding Sn, the Sn content is 0.1% or less. The Sn content is preferably 0.07% or less, and more preferably 0.06% or less.

P: 0.005% or more and 0.1% or less

P has an effect of improving the primary recrystallized texture and promoting the secondary recrystallization of crystal grains having favorable crystal orientation to effectively improve the magnetic properties. To achieve this effect, in the case of adding P, the P content is 0.005% or more. The P content is preferably 0.01% or more, more preferably 0.03% or more, and further preferably 0.05% or more. If the P content is more than 0.1%, cold rollability decreases. Accordingly, in the case of adding P, the P content is 0.1% or less.

Ni: 0.005% or more and 1.5% or less

Ni is an element having an effect of improving the magnetic properties by enhancing the uniformity of the hot-rolled sheet texture. To achieve this effect, in the case of adding Ni, the Ni content is 0.005% or more. If the Ni content is more than 1.5%, secondary recrystallization is difficult, and the magnetic properties degrade. Accordingly, in the case of adding Ni, the Ni content is 1.5% or less.

Cu: 0.005% or more and 1.5% or less

Cu has an effect of suppressing the oxidation of the steel sheet during secondary recrystallization annealing and promoting the secondary recrystallization of crystal grains having favorable crystal orientation to effectively improve the magnetic properties. To achieve this effect, in the case of adding Cu, the Cu content is 0.005% or more. If the Cu content is more than 1.5%, hot rollability decreases. Accordingly, in the case of adding Cu, the Cu content is 1.5% or less.

Cr: 0.005% or more and 0.1% or less

Cr is an element having an effect of stabilizing the formation of a forsterite base film. To achieve this effect, in the case of adding Cr, the Cr content is 0.005% or more. If the Cr content is more than 0.1%, secondary recrystallization is difficult, and the magnetic properties degrade. Accordingly, in the case of adding Cr, the Cr content is 0.1% or less.

Mo: 0.005% or more and 0.5% or less

Mo is an element having an effect of suppressing high-temperature oxidation and reducing surface defects called scab. To achieve this effect, in the case of adding Mo, the Mo content is 0.005% or more. If the Mo content is more than 0.5%, cold rollability decreases. Accordingly, in the case of adding Mo, the Mo content is 0.5% or less.

Ti: 0.0005% or more and 0.1% or less

Ti has an effect of inhibiting the growth of primary recrystallized grains and promoting the secondary recrystallization of crystal grains having favorable crystal orientation to improve the magnetic properties. To achieve this effect, in the case of adding Ti, the Ti content is 0.0005% or more. If the Ti content is more than 0.1%, Ti remains in the steel substrate and degrades the iron loss. Accordingly, in the case of adding Ti, the Ti content is 0.1% or less.

Nb: 0.0005% or more and 0.1% or less

Nb has an effect of inhibiting the growth of primary recrystallized grains and promoting the secondary recrystallization of crystal grains having favorable crystal orientation to improve the magnetic properties. To achieve this effect, in the case of adding Nb, the Nb content is 0.0005% or more. If the Nb content is more than 0.1%, Nb remains in the steel substrate and degrades the iron loss. Accordingly, in the case of adding Nb, the Nb content is 0.1% or less.

V: 0.0005% or more and 0.1% or less

V has an effect of inhibiting the growth of primary recrystallized grains and promoting the secondary recrystallization of crystal grains having favorable crystal orientation to improve the magnetic properties. To achieve this effect, in the case of adding V, the V content is 0.0005% or more. If the V content is more than 0.1%, V remains in the steel substrate and degrades the iron loss. Accordingly, in the case of adding V, the V content is 0.1% or less.

B: 0.0002% or more and 0.0025% or less

B has an effect of inhibiting the growth of primary recrystallized grains and promoting the secondary recrystallization of crystal grains having favorable crystal orientation to improve the magnetic properties. To achieve this effect, in the case of adding B, the B content is 0.0002% or more. If the B content is more than 0.0025%, B remains in the steel substrate and degrades the iron loss. Accordingly, in the case of adding B, the B content is 0.0025% or less.

Bi: 0.005% or more and 0.1% or less

Bi has an effect of, by segregating to grain boundaries, inhibiting the growth of primary recrystallized grains and promoting the secondary recrystallization of crystal grains having favorable crystal orientation to improve the magnetic properties. To achieve this effect, in the case of adding Bi, the Bi content is 0.005% or more. If the Bi content is more than 0.1%, Bi remains in the steel substrate and degrades the iron loss. Accordingly, in the case of adding Bi, the Bi content is 0.1% or less.

Te: 0.0005% or more and 0.01% or less

Te has an effect of, by segregating to grain boundaries, inhibiting the growth of primary recrystallized grains and promoting the secondary recrystallization of crystal grains having favorable crystal orientation to improve the magnetic properties. To achieve this effect, in the case of adding Te, the Te content is 0.0005% or more. If the Te content is more than 0.01%, Te remains in the steel substrate and degrades the iron loss. Accordingly, in the case of adding Te, the Te content is 0.01% or less.

Ta: 0.0005% or more and 0.01% or less

Ta has an effect of inhibiting the growth of primary recrystallized grains and promoting the secondary recrystallization of crystal grains having favorable crystal orientation to improve the magnetic properties. To achieve this effect, in the case of adding Ta, the Ta content is 0.0005% or more. If the Ta content is more than 0.01%, Ta remains in the steel substrate and degrades the iron loss. Accordingly, in the case of adding Ta, the Ta content is 0.01% or less.

The grain-oriented electrical steel sheet according to one of the disclosed embodiments can have a chemical composition containing, in mass %, C: 0.005% or less,
Si: 3.0% or more and 4.0% or less,
Mn: 0.05% or more and 0.50% or less,
sol. Al: 0.001% or less,
N: 0.0015% or less,
S: 0.0010% or less,
Se: 0.0010% or less, and optionally one or more selected from the group consisting of Sb: 0.005% or more and 0.1% or less,
Sn: 0.005% or more and 0.1% or less,
P: 0.005% or more and 0.1% or less,
Ni: 0.005% or more and 1.5% or less,
Cu: 0.005% or more and 1.5% or less,
Cr: 0.005% or more and 0.1% or less,
Mo: 0.005% or more and 0.5% or less,
Ti: 0.0005% or more and 0.1% or less,
Nb: 0.0005% or more and 0.1% or less,
V: 0.0005% or more and 0.1% or less,
B: 0.0002% or more and 0.0025% or less,
Bi: 0.005% or more and 0.1% or less,
Te: 0.0005% or more and 0.01% or less, and
Ta: 0.0005% or more and 0.01% or less,
with the balance being Fe and inevitable impurities.

[Orientation of Secondary Recrystallized Grains]

The reasons for limiting the orientation of secondary recrystallized grains will be described below. The secondary recrystallized grain orientation can be measured using a method such as the X-ray Laue method or the electron backscatter diffraction (EBSD) method. The measurement by the X-ray Laue method can be performed using, for example, the method described in JP 2005-121372 A. A specific measurement method is, for example, the method described in the EXAMPLES section.

Average value of $(\alpha^2+\beta^2)^{1/2}$: 5.0° or less $R_\beta \leq 20\%$

The grain-oriented electrical steel sheet according to one of the disclosed embodiments satisfies both of the following conditions (a) and (b):

(a) The average value of the deviation angle $(\alpha^2+\beta^2)^{1/2}$ calculated from the deviation angle $\alpha$ from ideal Goss orientation around the ND rotation axis and the deviation angle $\beta$ from ideal Goss orientation around the TD rotation axis is 5.0° or less.

(b) The area ratio $R_\beta$ of crystal grains with $\beta \leq 0.50°$ is 20% or less.

As a result of the orientation of secondary recrystallized grains satisfying the conditions (a) and (b), favorable magnetic properties can be achieved as described above. No lower limit is placed on the average value of $(\alpha^2+\beta^2)^{1/2}$, yet the average value of $(\alpha^2+\beta^2)^{1/2}$ is preferably 0.5° or more to prevent an excessive increase of the area ratio with $\beta \leq 0.5°$. No lower limit is placed on $R_\beta$, yet $R_\beta$ may be 1% or more because the inclusion of fine grains to some extent is inevitable.

The average value of $(\alpha^2+\beta^2)^{1/2}$ can be calculated by measuring the $\alpha$ angle and the $\beta$ angle at each of a plurality of measurement positions of the steel sheet, calculating the value of $(\alpha^2+\beta^2)^{1/2}$ from the obtained $\alpha$ and $\beta$, and averaging the values of $(\alpha^2+\beta^2)^{1/2}$ at all measurement positions. Specific measurement conditions are, for example, as described in the EXAMPLES section.

Average γ angle: 3.0° or more and 7.0° or less

As a result of the average value (average γ angle) of the deviation angle γ from ideal Goss orientation around the RD rotation axis being 3.0° or more and 7.0° or less, the iron loss can be further reduced as described above. The average γ angle can be calculated by measuring the γ angle at each of a plurality of measurement positions of the steel sheet and averaging the measured values at all measurement positions. Specific measurement conditions are, for example, as described in the EXAMPLES section.

A method for manufacturing a grain-oriented electrical steel sheet according to one of the disclosed embodiments will be described below.

[Chemical Composition of Steel Slab]

The reasons for limiting the chemical composition of the steel slab will be described below. Since the steel is subjected to decarburization, purification, and the like in the grain-oriented electrical steel sheet manufacturing process, the chemical composition of the steel slab is different from the chemical composition of the grain-oriented electrical steel sheet manufactured using the steel slab. In the following description, too, "%" representing the content of each component element denotes "mass %" unless otherwise noted.

C: 0.025% or more and 0.060% or less

C is an element useful in improving the primary recrystallized texture. If the C content is less than 0.025%, the γ (austenite) transformation quantity decreases. When the γ transformation quantity decreases, the area ratio $R_C$ of carbide with a particle size of 1 μm or more, which results from γ phase, cannot be ensured sufficiently, and the above-described desired secondary recrystallized grain orientation cannot be achieved. The C content is therefore 0.025% or more. In terms of the magnetic properties, the C content is preferably 0.030% or more. If the C content is more than 0.060%, the γ transformation quantity is excessively high, and $R_C$ is excessively high, making it impossible to achieve the desired secondary recrystallized grain orientation. The C content is therefore 0.060% or less. In terms of the magnetic properties, the C content is preferably 0.050% or less.

Si: 3.0% or more and 4.0% or less

Si is an element having an effect of improving iron loss by increasing electrical resistance. To achieve this effect, the Si content is 3.0% or more. The Si content is preferably 3.1% or more, and more preferably 3.2% or more. If the Si content is more than 4.0%, secondary workability decreases significantly. The Si content is therefore 4.0% or less. The Si content is preferably 3.8% or less, and more preferably 3.7% or less.

Mn: 0.05% or more and 0.50% or less

Mn has an effect of, by combining with S or Se to form MnS or MnSe, stabilizing the magnetic properties through stabilization of the primary recrystallized grain size. Mn also has an effect of improving hot workability during manufacture. To achieve these effects, the Mn content is 0.05% or more. The Mn content is preferably 0.07% or more, and more preferably 0.09% or more. If the Mn content is more than 0.50%, the primary recrystallized texture degrades and the magnetic properties degrade. The Mn content is therefore 0.50% or less. The Mn content is preferably 0.25% or less, more preferably 0.15% or less, and further preferably 0.10% or less.

sol. Al: less than 0.01%

If the Al content is excessively high, secondary recrystallization is difficult. Particularly if the sol. Al content is 0.01% or more, the average crystal grain size before final cold rolling decreases, making it impossible to achieve the desired secondary recrystallized grain orientation. Besides, secondary recrystallization is unlikely to occur under low-temperature slab heating conditions, and the magnetic properties degrade. The Al content is therefore less than 0.01% in sol. Al content. Lower sol. Al content is more desirable, and accordingly the lower limit may be 0%. In industrial terms, however, the lower limit may be more than 0%. Excessively reducing sol. Al can increase the manufacturing cost, and therefore the sol. Al content may be 0.0001% or more.

N: less than 0.006%

If the N content is excessively high, secondary recrystallization is difficult. Particularly if the N content is 0.006% or more, secondary recrystallization is unlikely to occur, and the magnetic properties degrade. The N content is, therefore, less than 0.006%. Lower N content is more desirable, and accordingly the lower limit may be 0%. In industrial terms, however, the lower limit may be more than 0%. Excessively reducing N can increase the manufacturing cost, and therefore the N content may be 0.00001% or more, may be 0.00005% or more, and may be 0.0001% or more.

S and Se: less than 0.010% in total

If the content of S and Se is excessively high, secondary recrystallization is difficult. Particularly if the total content of S and Se is 0.010% or more, secondary recrystallization is unlikely to occur, and the magnetic properties degrade. The total content of S and Se is, therefore, less than 0.010%. Lower total content of S and Se is more desirable, and accordingly the lower limit may be 0%. In industrial terms, however, the lower limit may be more than 0%. Excessively reducing S and Se can increase the manufacturing cost, and therefore the total content of S and Se may be 0.00001% or more, may be 0.00005% or more, and may be 0.0001% or more.

The S content is preferably 0.009% or less. The Se content is preferably 0.001% or less.

The steel slab according to one of the disclosed embodiments has a chemical composition containing the above-described components with the balance being Fe and inevitable impurities.

The steel slab according to one of the disclosed embodiments is basically composed of the above-described components. To achieve better magnetic properties, the chemical composition may optionally further contain one or more selected from the group consisting of Sb: 0.005% or more and 0.1% or less,
Sn: 0.005% or more and 0.1% or less,
P: 0.005% or more and 0.1% or less,
Ni: 0.005% or more and 1.5% or less,
Cu: 0.005% or more and 1.5% or less,
Cr: 0.005% or more and 0.1% or less,
Mo: 0.005% or more and 0.5% or less,
Ti: 0.0005% or more and 0.1% or less,
Nb: 0.0005% or more and 0.1% or less,
V: 0.0005% or more and 0.1% or less,
B: 0.0002% or more and 0.0025% or less,
Bi: 0.005% or more and 0.1% or less,
Te: 0.0005% or more and 0.01% or less, and
Ta: 0.0005% or more and 0.01% or less.

The reasons for limiting the contents of these elements are the same as the reasons for limiting the contents of the elements in the grain-oriented electrical steel sheet described above.

In the method for manufacturing a grain-oriented electrical steel sheet according to one of the disclosed embodiments, the steel slab having the chemical composition described above is subjected to the following processes in sequence:

heating (optional),
hot rolling,
hot band annealing,
cold rolling,
primary recrystallization annealing,
application of annealing separator,
coiling, and
secondary recrystallization annealing.

Processes other than these processes may be added before, after, or during these processes, as long as the object according to the present disclosure is not hampered. Each of the processes will be described in detail below.

[Heating]

Prior to hot rolling, the steel slab having the chemical composition described above may be optionally heated to a heating temperature. In the case of performing the heating, the heating temperature is 1300° C. or less, in order to reduce scale which forms during hot rolling. A low heating temperature is also desirable in terms of crystal texture refinement and in terms of rendering inhibitor components, which are mixed in inevitably, harmless and realizing uniform primary recrystallized texture. No lower limit is placed on the heating temperature, yet the heating temperature is preferably 1050° C. or more in terms of suppressing an increase in rolling load.

In the case of not performing the heating, the steel slab can be subjected to hot rolling immediately after casting, without reheating.

[Hot Rolling]

The steel slab is then subjected to hot rolling, to obtain a hot-rolled steel sheet. In the case of performing the heating described above, the heated steel slab is subjected to hot rolling. The hot rolling conditions are not limited, and may be any conditions. If the finisher delivery temperature is less than 750° C., however, the rolling load increases, which may hamper rolling. Accordingly, the finisher delivery temperature in the hot rolling is preferably 750° C. or more. If the finisher delivery temperature is more than 950° C., scale increases, and may be unable to be removed by pickling or the like before cold rolling. Accordingly, the finisher delivery temperature in the hot rolling is preferably 950° C. or less.

[Hot Band Annealing]

The hot-rolled steel sheet is then subjected to hot band annealing. The hot band annealing conditions are not limited, and may be any conditions. If the hot band annealing temperature is less than 900° C., however, the band texture in the hot rolling remains. This may make it difficult to realize primary recrystallized texture with uniform grain size, and hinder the development of secondary recrystallization. Hence, for high development of Goss texture in the resultant grain-oriented electrical steel sheet, the hot band annealing temperature is preferably 900° C. or more. If the hot band annealing temperature is more than 1120° C., grains coarsen. This may make it difficult to realize primary recrystallized texture with uniform grain size. Hence, for high development of Goss texture in the resultant grain-oriented electrical steel sheet, the hot band annealing temperature is preferably 1120° C. or less. The annealing time in the hot band annealing is preferably about 10 sec to 10 min.

[Cold Rolling]

After the hot band annealing, the annealed hot-rolled steel sheet is subjected to cold rolling to obtain a cold-rolled steel sheet. The cold rolling may be performed by any method. Cold rolling may be performed only once, or twice or more with intermediate annealing performed therebetween.

In the case of performing intermediate annealing between cold rolling operations, the intermediate annealing temperature is preferably 900° C. or more and 1120° C. or less. If the intermediate annealing temperature is less than 900° C., the band texture in the hot rolling remains. This may make it difficult to realize primary recrystallized texture with uniform grain size, and hinder the development of secondary recrystallization. If the intermediate annealing temperature is more than 1120° C., grains coarsen. This may make it difficult to realize primary recrystallized texture with uniform grain size. The intermediate annealing time is preferably about 10 sec to 10 min.

$R_C$: 0.5% to 20.0%

In the present disclosure, the area ratio $R_C$ of carbide with a particle size of 1 μm or more at the final cold rolling start in the cold rolling needs to be 0.5% to 20.0%. If $R_C$ does not satisfy this condition, the primary recrystallized texture changes, and the above-described secondary recrystallized grain orientation cannot be realized in the resultant grain-oriented electrical steel sheet. Herein, "final cold rolling" denotes, in the case of performing cold rolling only once, the cold rolling, and in the case of performing cold rolling twice or more with intermediate annealing performed therebetween, the cold rolling after the last intermediate annealing.

$R_C$ can be set to 0.5% to 20.0% by limiting the C content in the steel slab used to the foregoing range and adjusting the residence time from 900° C. to 700° C. in the annealing before the final cold rolling. By increasing the residence time, the transformation from γ phase to α phase is promoted, as a result of which Rc can be decreased. Moreover, since the total amount of γ phase changes depending on the C content in the steel sheet, the residence time may be increased in the case where the C content is high. By adjusting the C content and the residence time in this way, $R_C$ can be set to 0.5% to 20.0%.

The residence time ($t_{900\text{-}700° C.}$) from 900° C. to 700° C. in the annealing before the final cold rolling is not limited, and may be adjusted so that $R_C$ will be 0.5% to 20.0%. Although depending on the C content, under typical conditions, $t_{900\text{-}700° C.}$ is preferably 6 sec or more, and preferably 10 sec or more. Moreover, $t_{900\text{-}700° C.}$ is preferably 200 sec or less, and preferably 180 sec or less. Herein, "annealing before final cold rolling" denotes, in the case of performing cold rolling only once, the hot band annealing before the cold rolling, and in the case of performing cold rolling twice or more with intermediate annealing performed therebetween, the last intermediate annealing.

The reason why the secondary recrystallized grain orientation can be limited to the favorable range by setting $R_C$ to 0.5% to 20.0% is not exactly clear, but is considered as follows. It is assumed that coarse carbide with a particle size of 1 μm or more at the final cold rolling start was γ phase during the hot rolling, and positively affects the destruction of the band texture caused by the hot rolling during recrystallization in the annealing before the final cold rolling. Coarse carbide with a particle size of 1 μm or more is substantially present only in recrystallized grain boundaries, and is not present in crystal grains. It is known that, in final cold rolling, deformation bands form in recrystallized grains, creating primary recrystallization nuclei having {411}<148> orientation. Since coarse carbide with a particle size of 1 μm or more is hard, rolling strain accumulates around the coarse carbide in the final cold rolling. Consequently, the coarse carbide becomes a recrystallization nucleation site, but its orientation is randomized. Here, crystal grain boundaries are preferentially selected as the coarse carbide precipitation site. In the case where Rc is low, the coarse carbide is present only in crystal grain boundaries. In the case where Rc is high, on the other hand, the coarse carbide precipitates into grains because crystal grain boundaries cannot cover the total amount of precipitation. Thus, lowering the value of Rc can reduce the amount of coarse carbide precipitated into grains.

It is expected that, through the above-described control to prevent the formation of coarse carbide in grains, the formation proportion of primary recrystallization nuclei having {411}<148> orientation increases, and consequently the orientation of the resultant secondary recrystallized grains can be limited to the foregoing range. If $R_C$ is less than 0.5%, the destruction of the hot-rolled band texture is insufficient, so that favorable secondary recrystallized grain orientation cannot be achieved. If $R_C$ is more than 20%, coarse carbide present in recrystallized grains in the annealing before the final cold rolling increases, as a result of which the primary recrystallized texture is randomized and the formation of primary recrystallization nuclei having {411}<148> orientation decreases, making it impossible to achieve favorable secondary recrystallized grain orientation.

D: 50 μm or more and 300 μm or less $T_{max}$: 150° C. or more

In the cold rolling, the average crystal grain size (D) in the steel sheet at the final cold rolling start is 50 μm or more and 300 μm or less. Moreover, the maximum temperature ($T_{max}$) in the final cold rolling is 150° C. or more. In other words, the temperature (T) of at least one pass in the final cold rolling is 150° C. or more. By limiting D and $T_{max}$ to these ranges, the formation proportion of primary recrystallization nuclei having {411}<148> orientation can be enhanced to achieve favorable secondary recrystallized grain orientation. D is preferably 90 μm or more, and more preferably 100 μm or more. D is preferably 250 μm or less, and more preferably 200 μm or less. $T_{max}$ is preferably 180° C. or more, and more preferably 200° C. or more. No upper limit is placed on $T_{max}$, yet $T_{max}$ is preferably 250° C. or less in terms of suppressing an excessive increase in rolling load.

[Primary Recrystallization Annealing]

After the cold rolling, the obtained cold-rolled steel sheet is subjected to primary recrystallization annealing. The purpose of the primary recrystallization annealing is to primary recrystallize the cold-rolled steel sheet having rolled microstructure and adjust it to a primary recrystallized grain size optimal for secondary recrystallization. The primary recrystallization annealing conditions are not limited, and may be any conditions. In terms of achieving the purpose more reliably, however, the annealing temperature in the primary recrystallization annealing is preferably about 800° C. or more and less than 950° C. The annealing atmosphere in the primary recrystallization annealing is not limited, and may be any atmosphere. The primary recrystallization annealing may also serve as decarburization annealing. In the case of performing primary recrystallization annealing also serving as decarburization annealing, for example, a wet hydrogen-nitrogen atmosphere or a wet hydrogen-argon atmosphere may be used.

The heating rate in the primary recrystallization annealing is not limited, and may be any value. It is, however, preferable that the average heating rate in a temperature range of 500° C. to 700° C. is 50° C./sec or more. As a result of the average heating rate being 50° C./sec or more, the formation proportion of primary recrystallization nuclei having {411}<148> orientation can be enhanced to thus achieve more favorable secondary recrystallized grain orientation. No upper limit is placed on the average heating rate. However, given that an excessively high average heating rate causes a problem of an increase in energy (such as electric power) used for heating, the average heating rate is preferably 500° C./sec or less, more preferably 400° C./sec or less, and further preferably 300° C./sec or less.

[Application of Annealing Separator]

After the primary recrystallization annealing, an annealing separator is applied to the steel sheet surface before the secondary recrystallization annealing. The composition of the annealing separator is not limited, and an annealing separator having any composition may be used. Typically, an annealing separator containing oxide as a main component is used. In the case of forming a forsterite film on the steel sheet surface after the secondary recrystallization annealing, MgO is used as the oxide. In the case where a forsterite film need not be formed, the oxide may be any oxide whose melting point is higher than the secondary recrystallization annealing temperature. Examples of the oxide whose melting point is higher than the secondary recrystallization annealing temperature include $Al_2O_3$ and CaO. No lower limit is placed on the content of the oxide as the main component in the annealing separator, yet the oxide content is preferably 50 mass % or more, and more preferably 70 mass % or more. No upper limit is placed on the oxide content, and the oxide content may be 100 mass % or less, and may be 95 mass % or less. The annealing separator may contain other components such as $TiO_2$, in addition to the oxide as the main component.

The annealing separator may further contain, as an additive, one or more selected from the group consisting of sulfide, sulfate, selenide, and selenite. The additive dissolves during the secondary recrystallization annealing at a temperature of, for example, about 700° C., and supplies S and Se as inhibitor elements into the steel sheet. Thus, the use of the additive can enhance the normal grain growth inhibiting capability in the secondary recrystallization annealing and further improve the magnetic properties of the grain-oriented electrical steel sheet. This effect can be achieved even with a relatively small amount of the additive, and therefore the content of the additive in the annealing separator is not limited. In terms of achieving a sufficient magnetic property improving effect, however, the content of the additive is preferably 1 part by mass or more with respect to 100 parts by mass of the oxide (MgO) as the main component. If the content of the additive is excessively high, oxidizability is excessively high. Excessively high oxidizability causes the forsterite film to be excessively thick, and consequently decreases the bending exfoliation property of the forsterite film formed. The content of the additive is therefore preferably 30 parts by mass or less with respect to 100 parts by mass of the oxide (MgO) as the main component.

[Coiling]

The steel sheet to which the annealing separator has been applied is then coiled to obtain a coil. The coiling may be performed according to a conventional method. No lower limit is placed on the diameter of the coil and the lower limit may be any value, yet the diameter of the coil is preferably 700 mm or more. If the diameter of the coil is 700 mm or more, degradation of secondary recrystallized grain orientation caused by coil curvature can be reduced to thus achieve further favorable secondary recrystallized grain orientation. The diameter of the coil is more preferably 900 mm or more, and further preferably 1100 mm or more. No upper limit is placed on the coil diameter. However, since a coil of an excessively large diameter is difficult to handle, the diameter of the coil is preferably 4000 mm or less, more preferably 3000 mm or less, and further preferably 2000 mm or less.

[Secondary Recrystallization Annealing]

The coil is then subjected to secondary recrystallization annealing. The secondary recrystallization annealing conditions are not limited, and the secondary recrystallization annealing may be performed according to a conventional method. In terms of completing secondary recrystallization, the average heating rate in a temperature range of 800° C. or more and 900° C. or less in the secondary recrystallization annealing is preferably 5° C./h or less.

The secondary recrystallization annealing may also serve as purification annealing. In the case of performing secondary recrystallization annealing also serving as purification annealing, the purification temperature is preferably more than 1180° C. The atmosphere in the purification annealing is preferably an atmosphere containing $H_2$ gas, and more preferably an atmosphere containing 10 vol % or more of $H_2$. By performing the purification annealing under these conditions, it is possible to completely purify components such as Al, S, and Se in addition to C and N that, even in an infinitesimal quantity, cause a decrease in magnetic properties. The purification time is not limited, but is typically about 2 h to 20 h.

In the case of using an annealing separator containing MgO, the grain-oriented electrical steel sheet after the secondary recrystallization annealing has a forsterite film formed on its surface.

[Insulating Coating]

After the secondary recrystallization annealing, an insulating coating may be formed on the surface of the obtained grain-oriented electrical steel sheet. The insulating coating can be formed by uncoiling the coiled grain-oriented electrical steel sheet that has undergone the secondary recrystallization annealing, applying a treatment solution for insulating coating formation to the surface of the grain-oriented electrical steel sheet, and then baking it. The insulating coating is not limited, and may be any insulating coating. The treatment solution may be, for example, an application liquid containing phosphate, chromate, and colloidal silica. The baking may be performed, for example, at about 800° C.

[Flattening Annealing]

Flattening annealing may be further performed to adjust the shape of the grain-oriented electrical steel sheet. The flattening annealing may also serve as the insulating coating baking described above.

The manufacturing conditions other than those described above may be in accordance with typical grain-oriented electrical steel sheet manufacturing methods.

EXAMPLES

More detailed description will be given below, based on examples. The following examples merely represent preferred examples, and the present disclosure is not limited to these examples. Modifications can be made within the range in which the subject matter of the present disclosure is applicable, with such modifications being also included in the technical scope of the present disclosure.

Example 1

Grain-oriented electrical steel sheets were manufactured using a plurality of steel slabs having the following chemical composition.

Chemical Composition of Steel Slab

The chemical composition contains, in mass %,

C: 0.038%,
Si: 3.4%,
Mn: 0.12%,
Sb: 0.06%,
P: 0.06%,
sol. Al: 0.007%,
N: 0.004%,
S: 0.003%, and
Se: 0.0001%, with the balance being Fe and inevitable impurities.

Each grain-oriented electrical steel sheet was manufactured by the following procedure. First, the steel slab was reheated to 1250° C., and then hot rolled to obtain a hot-rolled steel sheet with a sheet thickness of 2.4 mm. The hot-rolled steel sheet was then subjected to hot band annealing. In the hot band annealing, the hot-rolled steel sheet was held at the soaking temperature shown in Table 1 for 30 sec. The residence time ($t_{900\text{-}700° C.}$) from 900° C. to 700° C. during cooling in the hot band annealing is shown in Table 1. In a temperature range of 700° C. or less, the hot-rolled steel sheet was rapidly cooled at a cooling rate of 40° C./sec.

The annealed hot-rolled steel sheet was then cold rolled with the maximum temperature ($T_{max}$) shown in Table 1, to obtain a cold-rolled steel sheet with a final sheet thickness of 0.23 mm. Subsequently, the cold-rolled steel sheet was subjected to primary recrystallization annealing also serving as decarburization, to obtain a primary recrystallized steel sheet. The primary recrystallization annealing conditions were as follows: heating rate from 500° C. to 700° C.: 150° C./sec, annealing temperature: 850° C., annealing time: 120 sec, annealing atmosphere: $H_2$: 55%, $N_2$: 45%, and dew point: 55° C.

After the primary recrystallization annealing, 12.5 g/m² of an annealing separator containing MgO as a main component was applied to the surface of the primary recrystallized steel sheet. After drying the annealing separator, the primary recrystallized steel sheet to which the annealing separator had been applied was coiled to obtain a coil. The coil had an inner diameter of 500 mm and an outer diameter of 1500 mm.

Subsequently, the coiled steel sheet was subjected to secondary recrystallization annealing also serving as purification annealing. The temperature hysteresis in the secondary recrystallization annealing was as follows:

heating to 800° C. at 15° C./h,
heating from 800° C. to 880° C. at 2.0° C./h,
holding at 880° C. for 50 h,
heating to 1160° C. at 5.0° C./h, and
soaking at 1160° C. for 5 h.

As the atmosphere gas in the secondary recrystallization annealing, $N_2$ gas was used in a temperature range up to 880° C., and $H_2$ was used in a temperature range of 880° C. or more.

A treatment solution containing phosphate, chromate, and colloidal silica at a mass ratio of 3:1:3 was applied to the surface of the obtained secondary recrystallization annealed sheet, and flattening annealing was performed.

During the manufacturing process described above, the area ratio $R_C$ of carbide with a particle size of 1 μm or more at the final cold rolling start and the average crystal grain size D at the final cold rolling start were measured by the following methods. The measurement results are shown in Table 1.

[Carbide Area Ratio $R_C$]

The cross-sectional texture at a sheet transverse center position of the steel sheet was photographed by an optical microscope or a scanning electron microscope, and the area ratio ($R_C$) of carbide with a particle size of 1 μm or more in the whole sheet thickness was measured by image processing. The length of the measurement region in the rolling direction was not less than the sheet thickness.

[Average Crystal Grain Size D]

The cross-sectional texture at a sheet transverse center position of the steel sheet was photographed by an optical microscope or a scanning electron microscope, and the average equivalent circular diameter of crystal in the whole sheet thickness was measured by counting or image processing and taken to be the average crystal grain size (D). The number of crystal grains for which the average value was calculated was 100 or more.

After performing the flattening annealing, a sample was collected from a position equivalent to the sheet transverse center and a coil diameter of 1000 mm of the resultant coil, and the iron loss $W_{17/50}$ and the magnetic flux density $B_8$ were measured. Furthermore, the secondary recrystallized grain orientation in a measurement region of 720 mm×280 mm in the sample was measured at 5 mm pitch using the X-ray Laue method, and the average value of $(\alpha^2+\beta^2)^{1/2}$ which is the deviation angle from <100> direction, the area ratio $R_\beta$ of crystal grains with 0.50°, and the average value of the deviation angle γ (average γ angle) were calculated. The measurement results are shown in Table 1.

The results of chemical analysis of the chemical composition of the resultant grain-oriented electrical steel sheet are shown in Table 2.

The results shown in Tables 1 and 2 demonstrate that each grain-oriented electrical steel sheet satisfying the conditions according to the present disclosure had favorable magnetic properties and was manufacturable using coil annealing with excellent productivity.

TABLE 1

| | Hot band annealing | | At start of final cold rolling | | Cold rolling | Secondary recrystallized grain orientation after flattening annealing | | | Magnetic properties | | |
|---|---|---|---|---|---|---|---|---|---|---|---|
| No. | Soaking temperature (° C.) | Residence time from 900 to 700° C. $t_{900\text{-}700° C.}$ (sec) | Carbide area ratio*1 $R_C$ (%) | Average crystal grain size D (μm) | Maximum temperature*2 $T_{max}$ (° C.) | Average value of $(\alpha^2+\beta^2)^{1/2}$ (°) | β ≤ 0.5° area ratio $R_\beta$ (%) | Average γ angle (°) | Magnetic flux density $B_8$ (T) | Iron loss $W_{17/50}$ (W/kg) | Remarks |
| 1 | 1070 | 200 | 3.2 | 170 | 220 | 4.0 | 8 | 6.8 | 1.940 | 0.76 | Example |
| 2 | 1070 | 50 | 5.7 | 170 | 220 | 3.8 | 12 | 4.5 | 1.949 | 0.75 | Example |
| 3 | 1070 | 20 | 12.4 | 170 | 220 | 4.6 | 17 | 5.1 | 1.922 | 0.78 | Example |
| 4 | 1050 | 50 | 4.5 | 130 | 220 | 4.4 | 11 | 6.6 | 1.935 | 0.77 | Example |
| 5 | 1090 | 50 | 7.7 | 210 | 220 | 4.2 | 10 | 5.0 | 1.938 | 0.77 | Example |
| 6 | 1070 | 50 | 12 | 170 | 250 | 4.5 | 9 | 4.1 | 1.935 | 0.76 | Example |
| 7 | 1070 | 5 | 24.4 | 170 | 220 | 4.7 | 25 | 2.8 | 1.920 | 0.85 | Comparative Example |
| 8 | 1070 | 500 | 0.3 | 170 | 220 | 4.0 | 24 | 2.2 | 1.939 | 0.85 | Comparative Example |
| 9 | 900 | 20 | 12.8 | 40 | 220 | 6.5 | 13 | 8.8 | 1.845 | 1.03 | Comparative Example |

TABLE 1-continued

| | Hot band annealing | | At start of final cold rolling | | | Secondary recrystallized grain orientation after flattening annealing | | | Magnetic properties | | |
|---|---|---|---|---|---|---|---|---|---|---|---|
| No. | Soaking temperature (° C.) | Residence time from 900 to 700° C. $t_{900\text{-}700°\,C.}$ (sec) | Carbide area ratio*1 $R_C$ (%) | Average crystal grain size D (μm) | Cold rolling Maximum temperature*2 $T_{max}$ (° C.) | Average value of $(\alpha^2 + \beta^2)^{1/2}$ (°) | $\beta \leq 0.5°$ area ratio $R_\beta$ (%) | Average γ angle (°) | Magnetic flux density $B_8$ (T) | Iron loss $W_{17/50}$ (W/kg) | Remarks |
| 10 | 1130 | 25 | 13.8 | <u>350</u> | 220 | <u>7.0</u> | 8 | 7.9 | 1.822 | 1.15 | Comparative Example |
| 11 | 1070 | 50 | 11.3 | 170 | <u>120</u> | <u>5.3</u> | 15 | 6.6 | 1.905 | 0.90 | Comparative Example |

*1 area ratio of carbide with particle size of 1 μm or more
*2 maximum temperature in final cold rolling

TABLE 2

| | Chemical composition of grain-oriented electrical steel sheet (mass %) * | | | | | | | | |
|---|---|---|---|---|---|---|---|---|---|
| No. | C | Si | Mn | N | sol. Al | S | Se | Sb | P |
| 1 | 0.0011 | 3.4 | 0.11 | 0.0006 | 0.0005 | 0.0004 | 0.0001 | 0.06 | 0.05 |
| 2 | 0.0012 | 3.3 | 0.12 | 0.0007 | 0.0006 | 0.0007 | 0.0001 | 0.05 | 0.06 |
| 3 | 0.0009 | 3.3 | 0.10 | 0.0009 | 0.0006 | 0.0006 | 0.0001 | 0.06 | 0.05 |
| 4 | 0.0015 | 3.4 | 0.11 | 0.0005 | 0.0008 | 0.0005 | 0.0001 | 0.05 | 0.05 |
| 5 | 0.0020 | 3.3 | 0.12 | 0.0008 | 0.0007 | 0.0004 | 0.0001 | 0.06 | 0.06 |
| 6 | 0.0011 | 3.4 | 0.11 | 0.0010 | 0.0007 | 0.0007 | 0.0001 | 0.05 | 0.05 |
| 7 | 0.0008 | 3.3 | 0.10 | 0.0004 | 0.0005 | 0.0004 | 0.0002 | 0.06 | 0.06 |
| 8 | 0.0013 | 3.4 | 0.10 | 0.0006 | 0.0004 | 0.0004 | 0.0001 | 0.05 | 0.05 |
| 9 | 0.0009 | 3.4 | 0.11 | 0.0007 | 0.0005 | 0.0005 | 0.0001 | 0.06 | 0.06 |
| 10 | 0.0010 | 3.4 | 0.12 | 0.0005 | 0.0006 | 0.0007 | 0.0002 | 0.06 | 0.05 |
| 11 | 0.0013 | 3.4 | 0.11 | 0.0005 | 0.0004 | 0.0005 | 0.0001 | 0.05 | 0.06 |

* the balance being Fe and inevitable impurities

Example 2

Grain-oriented electrical steel sheets were manufactured using a plurality of steel slabs having the following chemical composition.

Chemical Composition of Steel Slab

The chemical composition contains, in mass %,
C: 0.030%,
Si: 3.5%,
Mn: 0.10%,
Sb: 0.07%,
P: 0.07%,
Mo: 0.03%,
sol. Al: 0.007%,
N: 0.0042%,
S: 0.0025%, and
Se: 0.0001%, with the balance being Fe and inevitable impurities.

Each grain-oriented electrical steel sheet was manufactured by the following procedure. First, the steel slab was reheated to 1220° C., and then hot rolled to obtain a hot-rolled steel sheet with a sheet thickness of 2.8 mm. The hot-rolled steel sheet was then subjected to hot band annealing. In the hot band annealing, the hot-rolled steel sheet was held at a soaking temperature of 1000° C. for 30 sec.

The annealed hot-rolled steel sheet was then cold rolled at 80° C. to an intermediate sheet thickness of 2.2 mm.

After the cold rolling, intermediate annealing was performed. In the intermediate annealing, the steel sheet was held at the soaking temperature shown in Table 1 for 60 sec. The residence time ($t_{900\text{-}700°\,C.}$) from 900° C. to 700° C. during cooling in the intermediate annealing is shown in Table 3. In a temperature range of 700° C. or less, the steel sheet was rapidly cooled at a cooling rate of 50° C./sec.

The intermediate annealed steel sheet was then cold rolled with the maximum temperature shown in Table 3, to obtain a cold-rolled steel sheet with a final sheet thickness of 0.23 mm. In this example, the cold rolling after the intermediate annealing was the final rolling. Subsequently, the cold-rolled steel sheet was subjected to primary recrystallization annealing also serving as decarburization, to obtain a primary recrystallized steel sheet. The primary recrystallization annealing conditions were as follows: heating rate from 500° C. to 700° C.: 250° C./sec, annealing temperature: 840° C., annealing time: 120 sec, annealing atmosphere: $H_2$: 55%, $N_2$: 45%, and dew point: 53° C.

After the primary recrystallization annealing, 12.5 g/m² of an annealing separator containing MgO as a main component was applied to the surface of the primary recrystallized steel sheet. After drying the annealing separator, the primary recrystallized steel sheet to which the annealing separator had been applied was coiled to obtain a coil. The coil had an inner diameter of 500 mm and an outer diameter of 1500 mm.

Subsequently, the coiled steel sheet was subjected to secondary recrystallization annealing also serving as purification annealing. The temperature hysteresis in the secondary recrystallization annealing was as follows:
heating to 800° C. at 15° C./h,
heating from 800° C. to 850° C. at 2.0° C./h,
holding at 850° C. for 50 h,
heating to 1180° C. at 5.0° C./h, and
soaking at 1180° C. for 5 h.

As the atmosphere gas in the secondary recrystallization annealing, $N_2$ gas was used in a temperature range up to 850° C., and $H_2$ was used in a temperature range of 850° C. or more.

A treatment solution containing phosphate, chromate, and colloidal silica at a mass ratio of 3:1:3 was applied to the surface of the obtained secondary recrystallization annealed sheet, and flattening annealing was performed.

During the manufacturing process described above, the cross-sectional texture of the steel sheet at the final cold rolling start, that is, at the intermediate annealing end, was observed by an optical microscope, and $R_C$ and D were measured by the same methods as in Example 1. The measurement results are shown in Table 3.

A sample was collected from a position equivalent to a coil diameter of 1000 mm, and the average value of the deviation angle $(\alpha^2+\beta^2)^{1/2}$, $R_\beta$, and the average γ angle were measured by the same methods and conditions as in Example 1. The measurement results are shown in Table 3.

The results of chemical analysis of the chemical composition of the resultant grain-oriented electrical steel sheet are shown in Table 4.

The results shown in Tables 3 and 4 demonstrate that each grain-oriented electrical steel sheet satisfying the conditions according to the present disclosure had favorable magnetic properties and was manufacturable using coil annealing with excellent productivity.

TABLE 3

| No. | Intermediate annealing Soaking temperature (° C.) | Intermediate annealing Residence time from 900 to 700° C. $t_{900-700° C.}$ (sec) | Before final cold rolling Carbide area ratio*1 $R_C$ (%) | Before final cold rolling Average crystal grain size D (μm) | Cold rolling Maximum temperature*2 $T_{max}$ (° C.) | Secondary recrystallized grain orientation after flattening annealing Average value of $(\alpha^2+\beta^2)^{1/2}$ (°) | Secondary recrystallized grain orientation after flattening annealing β ≤ 0.5° area ratio $R_\beta$ (%) | Secondary recrystallized grain orientation after flattening annealing Average γ angle (°) | Magnetic properties Magnetic flux density $B_8$ (T) | Magnetic properties Iron loss $W_{17/50}$ (W/kg) | Remarks |
|---|---|---|---|---|---|---|---|---|---|---|---|
| 1 | 1050 | 100 | 1.2 | 120 | 220 | 3.5 | 15 | 4.8 | 1.955 | 0.74 | Example |
| 2 | 1050 | 50 | 3.7 | 120 | 220 | 3.6 | 13 | 5.5 | 1.950 | 0.75 | Example |
| 3 | 1050 | 20 | 6.5 | 120 | 220 | 3.8 | 10 | 5.0 | 1.946 | 0.73 | Example |
| 4 | 1020 | 50 | 4.4 | 100 | 220 | 3.9 | 13 | 4.3 | 1.944 | 0.75 | Example |
| 5 | 1080 | 50 | 8.5 | 160 | 220 | 4.2 | 19 | 5.9 | 1.948 | 0.78 | Example |
| 6 | 1050 | 50 | 6.0 | 120 | 250 | 3.8 | 13 | 4.4 | 1.945 | 0.75 | Example |
| 7 | 1050 | 200 | 0.4 | 120 | 220 | 4.5 | 23 | 2.6 | 1.935 | 0.86 | Comparative Example |
| 8 | 1050 | 500 | 0.2 | 120 | 220 | 4.8 | 27 | 2.1 | 1.933 | 0.87 | Comparative Example |
| 9 | 900 | 50 | 6.8 | 40 | 220 | 6.1 | 14 | 8.5 | 1.856 | 1.00 | Comparative Example |
| 10 | 1150 | 25 | 8.5 | 310 | 220 | 8.0 | 5 | 8.0 | 1.810 | 1.25 | Comparative Example |
| 11 | 1050 | 50 | 6.3 | 120 | 120 | 5.2 | 12 | 6.3 | 1.908 | 0.89 | Comparative Example |

*1area ratio of carbide with particle size of 1 μm or more
*2maximum temperature in final cold rolling

TABLE 4

Chemical composition of grain-oriented electrical steel sheet (mass %)*

| No. | C | Si | Mn | N | sol. Al | S | Se | Sb | P | Mo |
|---|---|---|---|---|---|---|---|---|---|---|
| 1 | 0.0010 | 3.4 | 0.09 | 0.0007 | 0.0006 | 0.0005 | 0.0001 | 0.06 | 0.07 | 0.03 |
| 2 | 0.0011 | 3.3 | 0.10 | 0.0005 | 0.0005 | 0.0006 | 0.0001 | 0.06 | 0.06 | 0.02 |
| 3 | 0.0013 | 3.4 | 0.08 | 0.0008 | 0.0007 | 0.0004 | 0.0001 | 0.07 | 0.06 | 0.03 |
| 4 | 0.0014 | 3.4 | 0.09 | 0.0004 | 0.0004 | 0.0007 | 0.0001 | 0.06 | 0.06 | 0.02 |
| 5 | 0.0018 | 3.3 | 0.10 | 0.0005 | 0.0005 | 0.0004 | 0.0001 | 0.07 | 0.06 | 0.02 |
| 6 | 0.0010 | 3.4 | 0.09 | 0.0009 | 0.0004 | 0.0006 | 0.0001 | 0.06 | 0.05 | 0.02 |
| 7 | 0.0015 | 3.3 | 0.10 | 0.0005 | 0.0005 | 0.0004 | 0.0001 | 0.07 | 0.06 | 0.03 |
| 8 | 0.0017 | 3.4 | 0.10 | 0.0005 | 0.0004 | 0.0007 | 0.0001 | 0.06 | 0.07 | 0.03 |
| 9 | 0.0010 | 3.4 | 0.10 | 0.0007 | 0.0007 | 0.0006 | 0.0001 | 0.06 | 0.06 | 0.03 |
| 10 | 0.0010 | 3.4 | 0.09 | 0.0005 | 0.0007 | 0.0007 | 0.0001 | 0.06 | 0.06 | 0.02 |
| 11 | 0.0011 | 3.4 | 0.08 | 0.0005 | 0.0004 | 0.0004 | 0.0001 | 0.06 | 0.07 | 0.03 |

*the balance being Fe and inevitable impurities

Example 3

Grain-oriented electrical steel sheets were manufactured using steel slabs each having the chemical composition shown in Table 5, by the following procedure. First, the steel slab was reheated to 1230° C., and then hot rolled to obtain a hot-rolled steel sheet with a sheet thickness of 2.4 mm. The hot-rolled steel sheet was then subjected to hot band annealing. In the hot band annealing, the hot-rolled steel sheet was held at a soaking temperature of 1050° C. for 30 sec. The residence time ($t_{900-700° C.}$) from 900° C. to 700° C. during cooling in the hot band annealing was 25 sec. In a temperature range of 700° C. or less, the hot-rolled steel sheet was rapidly cooled at a cooling rate of 40° C./sec.

The annealed hot-rolled steel sheet was then cold rolled at 200° C., to obtain a cold-rolled steel sheet with a final sheet thickness of 0.23 mm. Subsequently, the cold-rolled steel sheet was subjected to primary recrystallization annealing also serving as decarburization under the same conditions as in Example 1, to obtain a primary recrystallized steel sheet.

After the primary recrystallization annealing, 12.5 g/m² of an annealing separator containing MgO as a main component was applied to the surface of the primary recrystallized steel sheet. After drying the annealing separator, the primary recrystallized steel sheet to which the annealing separator had been applied was coiled to obtain a coil. The coil had an inner diameter of 500 mm and an outer diameter of 1500 mm.

Subsequently, the coiled steel sheet was subjected to secondary recrystallization annealing also serving as purification annealing. The temperature hysteresis in the secondary recrystallization annealing was as follows:

heating to 800° C. at 15° C./h,
heating from 800° C. to 870° C. at 2.0° C./h,
holding at 870° C. for 50 h,
heating to 1160° C. at 5.0° C./h, and
soaking at 1160° C. for 5 h.

As the atmosphere gas in the secondary recrystallization annealing, $N_2$ gas was used in a temperature range up to 870° C., and $H_2$ was used in a temperature range of 870° C. or more.

A treatment solution containing phosphate, chromate, and colloidal silica at a mass ratio of 3:1:3 was applied to the surface of the obtained secondary recrystallization annealed sheet, and flattening annealing was performed.

During the manufacturing process described above, the cross-sectional texture of the steel sheet at the final cold rolling start, that is, at the hot band annealing end, was observed by an optical microscope, and $R_C$ and D were measured by the same methods as in Example 1. The measurement results are shown in Table 6.

A sample was collected from a position equivalent to a coil diameter of 1000 mm, and the iron loss $W_{17/50}$, the magnetic flux density $B_8$, the average value of $(\alpha^2+\beta^2)^{1/2}$, $R_\beta$, and the average γ angle were measured by the same methods and conditions as in Example 1. The measurement results are shown in Table 6.

The results of chemical analysis of the chemical composition of the resultant grain-oriented electrical steel sheet are shown in Table 7.

The results shown in Tables 6 and 7 demonstrate that each grain-oriented electrical steel sheet satisfying the conditions according to the present disclosure had favorable magnetic properties and was manufacturable using coil annealing with excellent productivity.

TABLE 5

| | Chemical composition of steel slab (mass %) * | | | | | | | | | | | |
|---|---|---|---|---|---|---|---|---|---|---|---|---|
| No. | C | Si | Mn | N | sol. Al | S | Se | Sn | Sb | P | Others | Remarks |
| 1 | 0.035 | 3.3 | 0.10 | 0.004 | 0.006 | 0.003 | 0.0001 | 0.01 | 0.04 | 0.08 | — | Conforming steel |
| 2 | 0.045 | 3.3 | 0.12 | 0.003 | 0.007 | 0.008 | 0.0002 | 0.01 | 0.07 | 0.07 | — | Conforming steel |
| 3 | 0.056 | 3.0 | 0.08 | 0.002 | 0.005 | 0.002 | 0.0001 | 0.05 | 0.05 | 0.05 | — | Conforming steel |
| 4 | 0.035 | 3.4 | 0.09 | 0.003 | 0.006 | 0.003 | 0.0002 | 0.05 | 0.05 | 0.05 | Ni: 0.30 | Conforming steel |
| 5 | 0.034 | 3.2 | 0.17 | 0.005 | 0.005 | 0.004 | 0.0001 | 0.01 | 0.04 | 0.04 | Cu: 0.10 | Conforming steel |
| 6 | 0.043 | 3.3 | 0.05 | 0.003 | 0.007 | 0.007 | 0.0001 | 0.01 | 0.08 | 0.05 | Cr: 0.06 | Conforming steel |
| 7 | 0.050 | 3.5 | 0.15 | 0.004 | 0.003 | 0.004 | 0.0002 | 0.01 | 0.02 | 0.08 | Mo: 0.05 | Conforming steel |
| 8 | 0.033 | 3.2 | 0.10 | 0.004 | 0.004 | 0.003 | 0.0001 | 0.02 | 0.05 | 0.05 | Ti: 0.005 | Conforming steel |
| 9 | 0.041 | 3.6 | 0.08 | 0.003 | 0.007 | 0.002 | 0.0001 | 0.03 | 0.07 | 0.07 | Nb: 0.003 | Conforming steel |
| 10 | 0.053 | 3.5 | 0.15 | 0.003 | 0.009 | 0.001 | 0.0001 | 0.04 | 0.06 | 0.08 | V: 0.006 | Conforming steel |
| 11 | 0.043 | 3.4 | 0.14 | 0.004 | 0.003 | 0.003 | 0.0002 | 0.07 | 0.05 | 0.02 | B: 0.001 | Conforming steel |
| 12 | 0.032 | 3.3 | 0.13 | 0.003 | 0.003 | 0.001 | 0.0001 | 0.04 | 0.06 | 0.06 | Bi: 0.002 | Conforming steel |
| 13 | 0.042 | 3.2 | 0.10 | 0.005 | 0.006 | 0.002 | 0.0001 | 0.03 | 0.04 | 0.05 | Te: 0.004 | Conforming steel |
| 14 | 0.039 | 3.3 | 0.10 | 0.004 | 0.007 | 0.003 | 0.0001 | 0.04 | 0.02 | 0.02 | Ta: 0.01 | Conforming steel |
| 15 | 0.035 | 3.3 | 0.07 | 0.003 | 0.004 | 0.003 | 0.0001 | 0.01 | 0.05 | 0.07 | Cu: 0.06, Cr: 0.07, Mo: 0.05 | Conforming steel |
| 16 | 0.038 | 3.3 | 0.08 | 0.002 | 0.008 | 0.006 | 0.0001 | 0.02 | 0.08 | 0.10 | Cu: 0.05, Cr: 0.04, Mo: 0.03, Nb: 0.002 | Conforming steel |
| 17 | 0.020 | 3.2 | 0.10 | 0.004 | 0.006 | 0.003 | 0.0001 | 0.01 | 0.04 | 0.08 | — | Comparative steel |
| 18 | 0.070 | 3.3 | 0.15 | 0.003 | 0.006 | 0.003 | 0.0001 | 0.01 | 0.04 | 0.08 | — | Comparative steel |

* the balance being Fe and inevitable impurities

TABLE 6

| | Before final cold rolling | | Secondary recrystallized grain orientation after flattening annealing | | | Magnetic properties | | |
|---|---|---|---|---|---|---|---|---|
| No. | Carbide area ratio*[1] $R_C$ (%) | Average crystal grain size D (μm) | Average value of $(\alpha^2+\beta^2)^{1/2}$ (°) | $\beta \leq 0.5°$ area ratio $R_\beta$ (%) | Average γ angle (°) | Magnetic flux density $B_8$ (T) | Iron loss $W_{17/50}$ (W/kg) | Remarks |
| 1 | 5.2 | 130 | 4.0 | 12 | 5.1 | 1.940 | 0.79 | Example |
| 2 | 10.3 | 150 | 4.3 | 14 | 5.6 | 1.931 | 0.79 | Example |
| 3 | 18.5 | 140 | 4.6 | 17 | 6.3 | 1.927 | 0.8 | Example |
| 4 | 10.5 | 150 | 3.6 | 15 | 4.1 | 1.955 | 0.75 | Example |
| 5 | 5.8 | 130 | 3.8 | 13 | 4.7 | 1.946 | 0.77 | Example |
| 6 | 8.8 | 140 | 3.8 | 12 | 5.0 | 1.945 | 0.76 | Example |
| 7 | 12.5 | 120 | 3.9 | 10 | 3.2 | 1.941 | 0.75 | Example |
| 8 | 3.5 | 100 | 3.8 | 15 | 6.2 | 1.942 | 0.77 | Example |
| 9 | 6.5 | 180 | 3.5 | 11 | 5.6 | 1.955 | 0.75 | Example |
| 10 | 15.2 | 140 | 3.7 | 15 | 4.8 | 1.949 | 0.76 | Example |
| 11 | 8.5 | 100 | 3.8 | 11 | 3.8 | 1.945 | 0.77 | Example |
| 12 | 5.5 | 110 | 3.6 | 18 | 4.0 | 1.952 | 0.77 | Example |
| 13 | 7.7 | 130 | 3.8 | 13 | 6.0 | 1.945 | 0.76 | Example |
| 14 | 6.8 | 150 | 3.7 | 14 | 5.5 | 1.948 | 0.76 | Example |
| 15 | 6.9 | 130 | 3.4 | 12 | 4.2 | 1.958 | 0.74 | Example |
| 16 | 7.7 | 120 | 3.3 | 11 | 4.4 | 1.960 | 0.74 | Example |
| 17 | 0.0 | 200 | 4.3 | 28 | 2.1 | 1.930 | 0.92 | Comparative Example |
| 18 | 25.0 | 70 | 5.3 | 21 | 2.7 | 1.910 | 0.93 | Comparative Example |

*[1] area ratio of carbide with particle size of 1 μm or more

TABLE 7

Chemical composition of grain-oriented electrical steel sheet (mass %) *

| No. | C | Si | Mn | N | sol. Al | S | Se | Sn | Sb | P | Others |
|---|---|---|---|---|---|---|---|---|---|---|---|
| 1 | 0.0009 | 3.3 | 0.09 | 0.0008 | 0.0005 | 0.0004 | 0.0001 | 0.01 | 0.04 | 0.07 | — |
| 2 | 0.0008 | 3.3 | 0.11 | 0.0005 | 0.0007 | 0.0007 | 0.0001 | 0.01 | 0.06 | 0.07 | — |
| 3 | 0.0010 | 3.0 | 0.07 | 0.0005 | 0.0005 | 0.0005 | 0.0001 | 0.04 | 0.05 | 0.05 | — |
| 4 | 0.0013 | 3.4 | 0.07 | 0.0006 | 0.0006 | 0.0006 | 0.0001 | 0.04 | 0.05 | 0.05 | Ni: 0.30 |
| 5 | 0.0014 | 3.2 | 0.14 | 0.0005 | 0.0005 | 0.0004 | 0.0001 | 0.01 | 0.04 | 0.03 | Cu: 0.10 |
| 6 | 0.0090 | 3.3 | 0.04 | 0.0008 | 0.0007 | 0.0007 | 0.0001 | 0.01 | 0.07 | 0.05 | Cr: 0.06 |
| 7 | 0.0006 | 3.5 | 0.13 | 0.0006 | 0.0005 | 0.0005 | 0.0001 | 0.01 | 0.02 | 0.08 | Mo: 0.04 |
| 8 | 0.0013 | 3.2 | 0.09 | 0.0005 | 0.0004 | 0.0005 | 0.0001 | 0.02 | 0.04 | 0.04 | Ti: 0.004 |
| 9 | 0.0010 | 3.6 | 0.06 | 0.0007 | 0.0007 | 0.0004 | 0.0001 | 0.02 | 0.06 | 0.07 | Nb: 0.002 |
| 10 | 0.0013 | 3.5 | 0.13 | 0.0005 | 0.0008 | 0.0008 | 0.0001 | 0.03 | 0.05 | 0.08 | V: 0.003 |
| 11 | 0.0010 | 3.4 | 0.12 | 0.0008 | 0.0004 | 0.0008 | 0.0001 | 0.05 | 0.05 | 0.02 | B: 0.001 |
| 12 | 0.0013 | 3.3 | 0.10 | 0.0007 | 0.0009 | 0.0005 | 0.0001 | 0.04 | 0.05 | 0.06 | Bi: 0.001 |
| 13 | 0.0011 | 3.2 | 0.09 | 0.0006 | 0.0006 | 0.0005 | 0.0001 | 0.02 | 0.04 | 0.05 | Te: 0.001 |
| 14 | 0.0009 | 3.3 | 0.09 | 0.0004 | 0.0007 | 0.0006 | 0.0001 | 0.02 | 0.02 | 0.02 | Ta: 0.005 |
| 15 | 0.0011 | 3.3 | 0.05 | 0.0005 | 0.0004 | 0.0004 | 0.0001 | 0.01 | 0.04 | 0.06 | Cu: 0.06, Cr: 0.07, Mo: 0.04 |
| 16 | 0.0010 | 3.3 | 0.06 | 0.0005 | 0.0004 | 0.0005 | 0.0001 | 0.01 | 0.07 | 0.10 | Cu: 0.05, Cr: 0.04, Mo: 0.02, Nb: 0.001 |
| 17 | 0.0009 | 3.2 | 0.08 | 0.0006 | 0.0005 | 0.0005 | 0.0001 | 0.01 | 0.04 | 0.07 | — |
| 18 | 0.0007 | 3.3 | 0.14 | 0.0006 | 0.0006 | 0.0007 | 0.0001 | 0.01 | 0.04 | 0.08 | — |

* the balance being Fe and inevitable impurities

The invention claimed is:

1. A grain-oriented electrical steel sheet comprising a chemical composition containing, in mass %,
C: 0.005% or less,
Si: 3.0% or more and 4.0% or less,
Mn: 0.05% or more and 0.50% or less,
sol. Al: 0.001% or less,
N: 0.0015% or less,
S: 0.0010% or less, and
Se: 0.0010% or less,
with the balance being Fe and inevitable impurities,
wherein an average value of a deviation angle $(\alpha^2+\beta^2)^{1/2}$ calculated from a deviation angle α from ideal Goss orientation around an ND rotation axis and a deviation angle β from ideal Goss orientation around a TD rotation axis is 4.5° or less, and
an area ratio $R_\beta$ of crystal grains with $\beta \leq 0.50°$ is 15% or less.

2. The grain-oriented electrical steel sheet according to claim 1, wherein an average value of a deviation angle γ from ideal Goss orientation around an RD rotation axis is 3.0° or more and 7.0° or less.

3. The grain-oriented electrical steel sheet according to claim 1, wherein the chemical composition further contains, in mass %, one or more selected from the group consisting of
Sb: 0.005% or more and 0.1% or less,
Sn: 0.005% or more and 0.1% or less,
P: 0.005% or more and 0.1% or less,
Ni: 0.005% or more and 1.5% or less,
Cu: 0.005% or more and 1.5% or less, Cr: 0.005% or more and 0.1% or less,
Mo: 0.005% or more and 0.5% or less,
Ti: 0.0005% or more and 0.1% or less,
Nb: 0.0005% or more and 0.1% or less,
V: 0.0005% or more and 0.1% or less,
B: 0.0002% or more and 0.0025% or less,
Bi: 0.005% or more and 0.1% or less,
Te: 0.0005% or more and 0.01% or less, and
Ta: 0.0005% or more and 0.01% or less.

4. The grain-oriented electrical steel sheet according to claim 2, wherein the chemical composition further contains, in mass %, one or more selected from the group consisting of Sb: 0.005% or more and 0.1% or less,
Sn: 0.005% or more and 0.1% or less,
P: 0.005% or more and 0.1% or less,
Ni: 0.005% or more and 1.5% or less,
Cu: 0.005% or more and 1.5% or less,
Cr: 0.005% or more and 0.1% or less,
Mo: 0.005% or more and 0.5% or less,
Ti: 0.0005% or more and 0.1% or less,
Nb: 0.0005% or more and 0.1% or less,
V: 0.0005% or more and 0.1% or less,
B: 0.0002% or more and 0.0025% or less,
Bi: 0.005% or more and 0.1% or less,
Te: 0.0005% or more and 0.01% or less, and
Ta: 0.0005% or more and 0.01% or less.

* * * * *